US012123208B1

(12) United States Patent
King

(10) Patent No.: US 12,123,208 B1
(45) Date of Patent: *Oct. 22, 2024

(54) ROOF SAFETY ANCHOR

(71) Applicant: Kevin King, Meridian, ID (US)

(72) Inventor: Kevin King, Meridian, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/527,255

(22) Filed: Dec. 2, 2023

Related U.S. Application Data

(63) Continuation of application No. 18/224,467, filed on Jul. 20, 2023, now Pat. No. 11,879,256.

(51) Int. Cl.
*E04G 21/32* (2006.01)
*A62B 35/00* (2006.01)

(52) U.S. Cl.
CPC ........ *E04G 21/328* (2013.01); *A62B 35/0043* (2013.01); *A62B 35/0068* (2013.01)

(58) Field of Classification Search
CPC .............. E04G 21/328; E04G 21/3276; A62B 35/0068; A62B 35/0043
See application file for complete search history.

(56) References Cited

U.S. PATENT DOCUMENTS

| | | | |
|---|---|---|---|
| 3,157,256 A | 11/1964 | Latta | |
| 3,371,951 A | 3/1968 | Bryant | |
| 3,492,033 A | 1/1970 | Meuller | |
| 4,641,986 A | 2/1987 | Tsui et al. | |
| 5,183,360 A | 2/1993 | Freeman | |
| 5,248,176 A | 9/1993 | Fredriksson | |
| 5,405,210 A | 4/1995 | Tsui | |
| 5,634,734 A | 6/1997 | Schrion, Jr. et al. | |
| 5,687,535 A | 11/1997 | Rohlf | |
| 5,743,576 A | 4/1998 | Schrion, Jr. et al. | |
| 5,823,588 A * | 10/1998 | Morghen | B66C 1/66 403/164 |
| 6,199,925 B1 | 3/2001 | Alba | |
| 6,267,422 B1 | 7/2001 | Alba | |
| 6,536,729 B1 | 3/2003 | Haddock | |
| 6,578,889 B2 | 6/2003 | Pearl | |
| 7,114,872 B2 | 10/2006 | Alba | |

(Continued)

FOREIGN PATENT DOCUMENTS

| | | |
|---|---|---|
| CA | 1271464 A | 7/1990 |
| CA | 2029279 A1 | 5/1992 |

(Continued)

OTHER PUBLICATIONS

Anchor Point Installation Fall Arrest Systems, Proactive Safety, Minchinbury, Australia, downloaded from the Internet from https://www.proactive-safety.com.au/anchor-point-installation/ on Jun. 17, 2023.

(Continued)

*Primary Examiner* — Eret C McNichols
(74) *Attorney, Agent, or Firm* — Stone Creek Services LLC; Alan M Flum

(57) ABSTRACT

Disclosed is a roof safety anchor capable of permanent and watertight attachment to a roof. Installation of the roof safety anchor does not require the removal of roof shingles. The roof safety anchor captures a D-ring and a roof fastener between a base and a lid. The roof fastener extends through the base and a gasket to secure the roof safety anchor to the roof.

20 Claims, 29 Drawing Sheets

(56) References Cited

U.S. PATENT DOCUMENTS

| | | | | |
|---|---|---|---|---|
| 8,122,648 | B1 | 2/2012 | Liu | |
| 8,136,311 | B2 | 3/2012 | Liu | |
| 8,424,638 | B1 | 4/2013 | Guthrie et al. | |
| 8,562,053 | B2 | 10/2013 | Davidson et al. | |
| 8,567,742 | B2 | 10/2013 | Sizelove et al. | |
| 8,602,705 | B2 | 12/2013 | Chen | |
| 8,833,033 | B2 | 9/2014 | Schaefer et al. | |
| 9,103,112 | B2 | 8/2015 | Corsi | |
| 9,242,740 | B2 | 1/2016 | Rod | |
| 9,302,889 | B2 | 4/2016 | Bateman et al. | |
| 9,496,820 | B2 | 11/2016 | Serry et al. | |
| 10,036,416 | B2 | 7/2018 | Moreau et al. | |
| 10,246,308 | B1 | 4/2019 | Lin | |
| 10,767,684 | B1 | 9/2020 | Meine et al. | |
| 11,167,957 | B1 | 11/2021 | Striebel et al. | |
| 11,598,098 | B2 * | 3/2023 | Shadwell | F16M 13/02 |
| 2004/0113039 | A1 | 6/2004 | Becker | |
| 2010/0207406 | A1 | 8/2010 | Tomeczek | |
| 2011/0265296 | A1 | 11/2011 | Perkins | |
| 2014/0331594 | A1 * | 11/2014 | Stearns | F16B 43/001<br>52/705 |
| 2020/0400272 | A1 | 12/2020 | Patton | |
| 2022/0275851 | A1 | 9/2022 | Sanchez Lopez | |

FOREIGN PATENT DOCUMENTS

| | | | |
|---|---|---|---|
| EP | 1690567 | B1 | 4/2010 |
| EP | 2317029 | A2 | 5/2011 |
| JP | 2000352164 | A | 12/2000 |
| JP | 5836093 | B2 | 12/2015 |
| WO | 2006085765 | A2 | 8/2006 |
| WO | 2018134210 | A1 | 7/2018 |

OTHER PUBLICATIONS

Roof Attachment Anchor Compatible with All Commercial Roofing Systems, Roofing Magazine, Apr. 7, 2020, downloaded from the Internet from https://roofingmagazine.com/rooftop-attachment-anchor-compatible-with-all-commercial-roofing-systems/ on Jun. 17. 2023.

OMG Power Grip 7 Universal Roof Mounting System, RM1020, Rev. 01302020, Jan. 2020, OMG Roofing Products, Agawam, Massachusetts.

Installation Manual, RT-[E] Mount 2 E Mount AIR 2, Jul. 2018, p. 17, Roof Tech, Chula Vista, California, downloaded from the Internet from: https://design.roof-tech.us/PDF/Installation-Manuals/Installation-Manual-RT-Air-Gen-II.pdf on Jun. 23, 2023.

* cited by examiner

ROOF SAFETY ANCHOR

CROSS-REFERENCE TO RELATED APPLICATIONS

This application is a continuation of U.S. patent application Ser. No. 18/224,467, filed on Jul. 20, 2023. The entire contents of U.S. patent application Ser. No. 18/224,467 are hereby incorporated by reference.

BACKGROUND

Roof safety is important. Neglecting roof safety can cause death or serious injury for construction workers and others who work on roofs. To address this, the construction industry developed fall protection systems.

A typical fall protection system may include a safety harness, a lifeline, and a roof safety anchor. The roof safety anchor, when secured to the roof, provides a stable attachment point for the lifeline. The lifeline connects to a roof safety anchor, typically by a releasable mechanism, such as a snap hook. A construction worker can move safely about a roof surface by wearing a safety harness tethered to a lifeline. In the event of a fall, the roof anchor, lifeline, and safety harness avert injury by preventing the construction worker from plunging to the ground.

Some roof safety anchors permanently attach to the roof and remain after the project is complete. Other roof safety anchors temporarily attach, which the contractor removes upon project completion.

SUMMARY

The inventor observed that contractors may not use roof safety anchors, lifelines, and harnesses. He reasoned that this may be because of the shortcomings in commercially available roof safety anchors. For example, some roof safety anchors designed for temporary attachment may require many roof fasteners. After the job is complete, the installer will remove the roof safety anchor and roof fasteners. They may seal the roof penetrations left by the roof fasteners. However, the roof penetrations could still be a potential source of leakage. Roof safety anchors designed for permanent attachment often require removal of roof shingles. This creates unnecessary labor, and has the potential to damage the roof. Temporary attachment systems, without roof penetration, such as ballast anchor systems, do not damage the roof but are typically expensive.

To solve these shortcomings, the inventor developed a roof safety anchor capable of permanent and watertight attachment to a roof without removal of roof shingles. The roof safety anchor pivotally captures a D-ring and one or more threaded roof fasteners between a base and a lid. A portion of the threaded roof fasteners extends through the base and a gasket to secure the roof safety anchor to the roof. The lid protects the threaded roof fasteners from rain. Other threaded fasteners secure the lid to the base. The gasket provides a waterproof seal between the threaded roof fasteners, base, and roof. The gasket may be an elastomeric pad made of butyl rubber or other deformable elastomeric material with adhesive properties.

Once the roof safety anchor is secured to a roof, a construction worker, wearing a safety harness tethered to a lifeline, would secure themselves to the roof safety anchor. Typically, they would attach the lifeline to the D-ring by a snap hook or other attachment mechanism.

The roof safety anchor secures to the roof over the roof shingles and secures to the roof surface without removal of shingles. The installation can be permanent. The lid and base cover the threaded roof fastener and prevent water from making its way to the gasket. The gasket, which is positioned between the base and the roof, covers and protects the roof from leakage through roof penetrations from the threaded roof fasteners.

To further enhance water tightness, the roof safety anchor may include other structural elements that keep water away from the threaded roof fasteners. For example, the base might include a flanged lip. The flanged lip may be a stepped recess or rabbet. Threaded blind apertures positioned in the base top surface can terminate into a side wall extending upward from the flanged lip. This creates an opening in the side wall for water to flow. The threaded blind apertures capture water leakage around the threaded fasteners. The flanged lip and opening, being lower than the base top surface, directs water away from the interior of the base to outside the roof safety anchor. The lid can include a lid rim that extends downward from the perimeter edge of lid bottom surface. The lid rim seats against the flanged lip and prevents water or rain from entering the roof safety anchor.

The lid and base can include additional structures to protect the threaded roof fasteners from water infiltration. For example, the base may include upper surrounds that form a closed perimeter around one or more of the threaded roof fasteners. These upper surrounds may recess into the base top surface or optionally extend upward away from the base top surface. The lid may include recessed portions that extend upward into the lid bottom surface. The recessed portions may align with corresponding upper surrounds to form a closed protective structure around the threaded roof fasteners.

The threaded roof fasteners may extend through apertures in the base. The base bottom surface can include lower surrounds that extend downward away from the base and form a closed perimeter around one or more of the apertures. The lower surrounds may include a counterbore or similar structure that surrounds one or more of the apertures. The base bottom surface may also include a base rim that surrounds the outside perimeter of the base and extends downward from the base bottom surface. The gasket seats over the base bottom surface. As the installer tightens the roof safety anchor against the roof, the gasket deforms and fills the voids between the rim, the surrounds, and the counterbores, and creates a watertight seal.

The lid may include water-shedding portions on the lid top surface that surround at least a portion of the threaded fasteners that secure the lid to the base. The water-shedding portions surrounding the threaded fasteners, can redirect water away from entry points in the roof safety anchor. The shape of base and lid may help shed water away from the roof safety anchor. For example, the base and lid may be polygon shaped, such as pentagons, or hexagons with the D-ring so positioned, that when properly placed on the roof, the peak of the polygons face the roof ridge line. Water rolling down the roof would shed downward from the peak of the roof anchor. To form such a peak, a vertex of the polygon can be positioned perpendicular to the rotational axis of the D-ring. The D-ring is typically aligned parallel to the roof ridge line, making the vertex perpendicular to the roof ridge line.

The base may include a lower groove extending between opposite sides of the base. The lid may likewise include an upper groove extending between opposite sides of the lid. Together, these grooves form a cavity that captures and secures the D-ring between the lid and base, while still allowing the D-ring to rotate. The lower groove may also act as a trough for shedding water.

The roof safety anchor can be easy to install and does not require the removal of roof shingles for permanent installation. Here is an example of a typical installation procedure. The installer would peel off a protective layer from the gasket secured to the bottom of the base. They would then position the base on the roof shingles over a roof structural member such as a purlin, joist, or truss upper chord. They would then secure the base to the roof by securing the threaded roof fasteners through the base, gasket, roof shingles, and roof decking, and into the roof structural member. With the D-ring in place over the base, the installer would then secure the cover to the base.

This Summary includes a select set of features and advantages of the roof safety anchor. Some of these features may be optional. The examples in this Summary are a sampling of what is possible and do not limit the claims.

DETAILED DESCRIPTION

The Detailed Description and Claims may use ordinals such as "first," "second," or "third," to differentiate between similarly named parts or to differentiate between examples. These ordinals do not imply order, preference, or importance. This disclosure uses "optional" to describe features or structures that are optional. Not using the word "optional" does not imply a feature or structure is not optional. In this disclosure, "or" is an "inclusive or," unless preceded by a qualifier, such as either, which signals an "exclusive or." As used throughout this disclosure, "comprise," "include," "including," "have," "having," "contain," "containing" or "with" are inclusive, or open ended, and do not exclude unrecited elements. This disclosure refers to "persons," "contractors," "installers," or "construction workers." These are generic terms and do not limit use of the examples or claims to a specific group of persons.

The Detailed Description includes the following sections: "General Principles and Example," "Typical Installation Method," "Additional Examples," and "Conclusion and Variations."

General Principles and Example

Figure 1:
FIG. 1 illustrates, a portion of a roof safety harness tethered to a roof safety anchor of the present disclosure, with roof safety anchor attached to a roof.
Figure 2A:
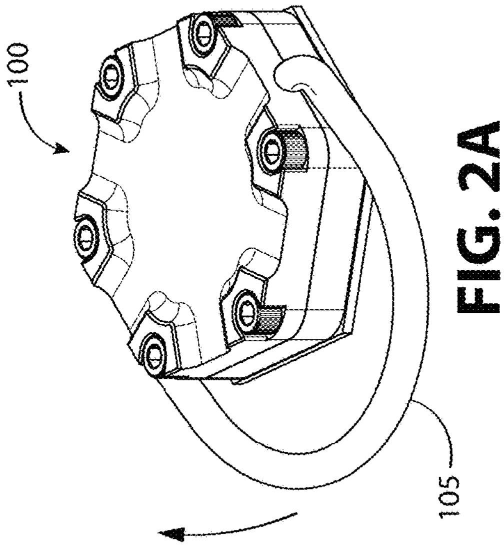
FIGS. 2A-2E illustrate in top isometric view, the roof safety anchor of FIG. 1 showing the D-ring rotated through different positions.
Figure 2B:
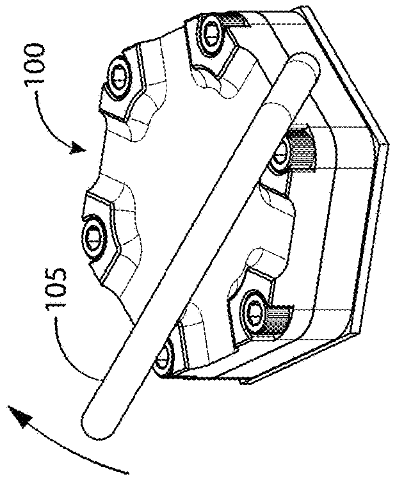
Figure 2C:
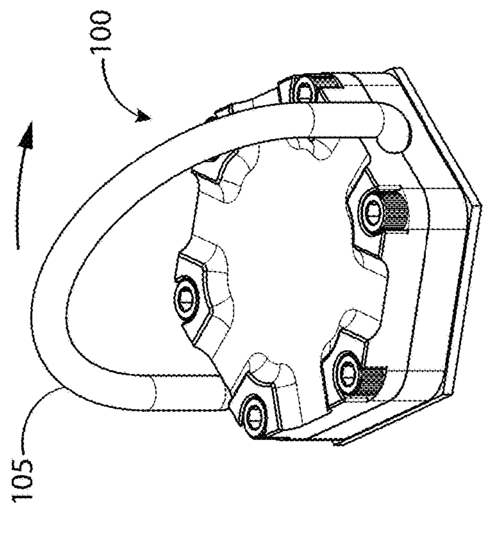
Figure 2D:
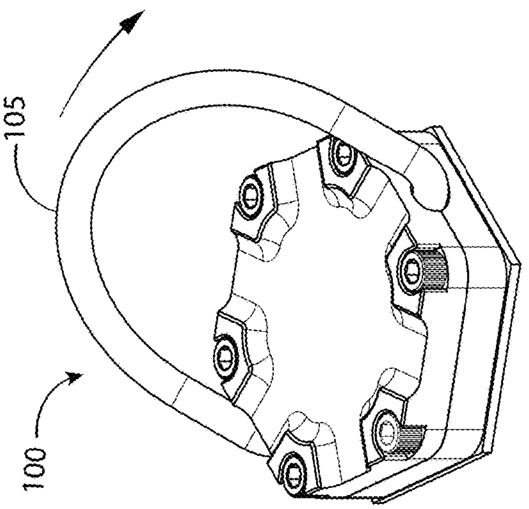
Figure 2E:
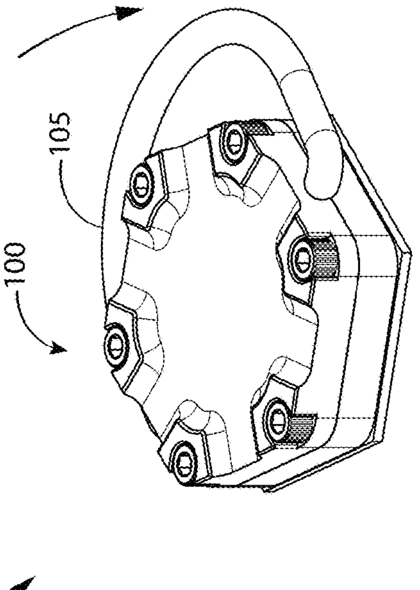

The inventor created a roof safety anchor that an installer or contractor can permanently attach to a roof without the removal of roof shingles, while still creating a watertight seal. FIG. 1 illustrates an example of such a roof safety anchor 100 secured to a roof 101 over top of the roof shingle 101_a_. A lifeline 102 tethers a construction worker (not shown) to the roof safety anchor 100. The lifeline 102, typically includes a snap hook 103 and rope 104 secured to the snap hook 103. The snap hook 103 is secured to a D-ring 105 extending from the roof safety anchor 100. The rope 104 passes through a rope grab and lanyard, which adjusts the length of the rope between the roof safety anchor 100 and the construction worker. The rope grab and lanyard attach to the construction worker's safety harness.

Figure 3:
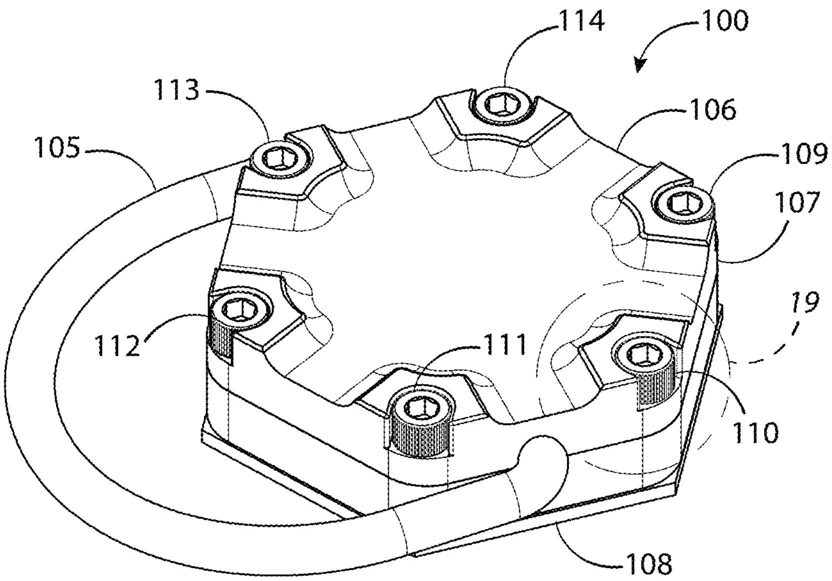
FIG. 3 illustrates, in top isometric view, the roof safety anchor of FIG. 1.

Referring to FIG. 3, the base 107 and the lid 106 pivotally capture the D-ring 105. This means that the D-ring 105 is secured between the base 107 and lid 106 but is free to pivot or rotate. As illustrated in FIGS. 2A-2E, the D-ring 105 can rotate over 180° with respect to the roof safety anchor 100. Referring to FIG. 1, the arc shape of the exposed portion of the D-ring 105 allows the snap hook 103 to move along an arc of 180° in a plane that is perpendicular to the plane of rotation of the D-ring 105. These two ranges of motion, or two degrees of freedom, allow the construction worker to move about the roof surface with nearly a 360° range of motion.

Figure 4:
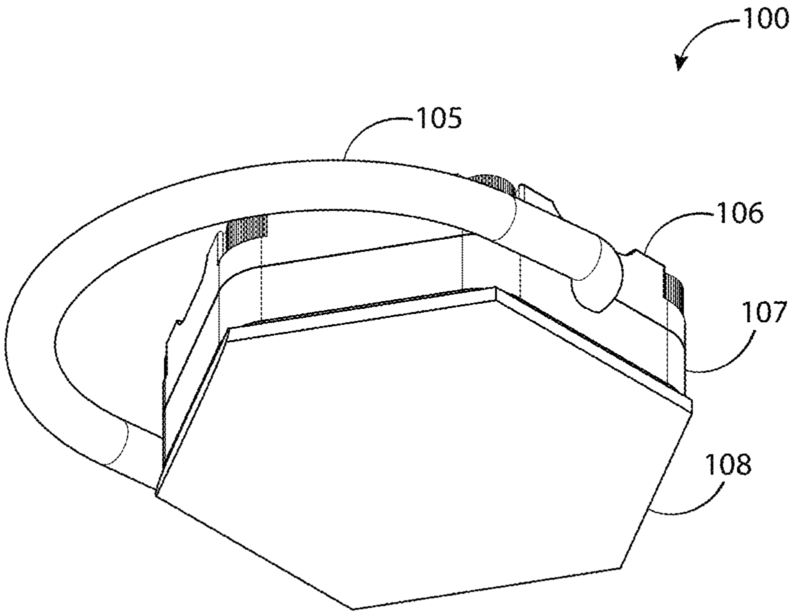
FIG. 4 illustrates, in bottom isometric view, the roof safety anchor of FIG. 3.
Figure 5:
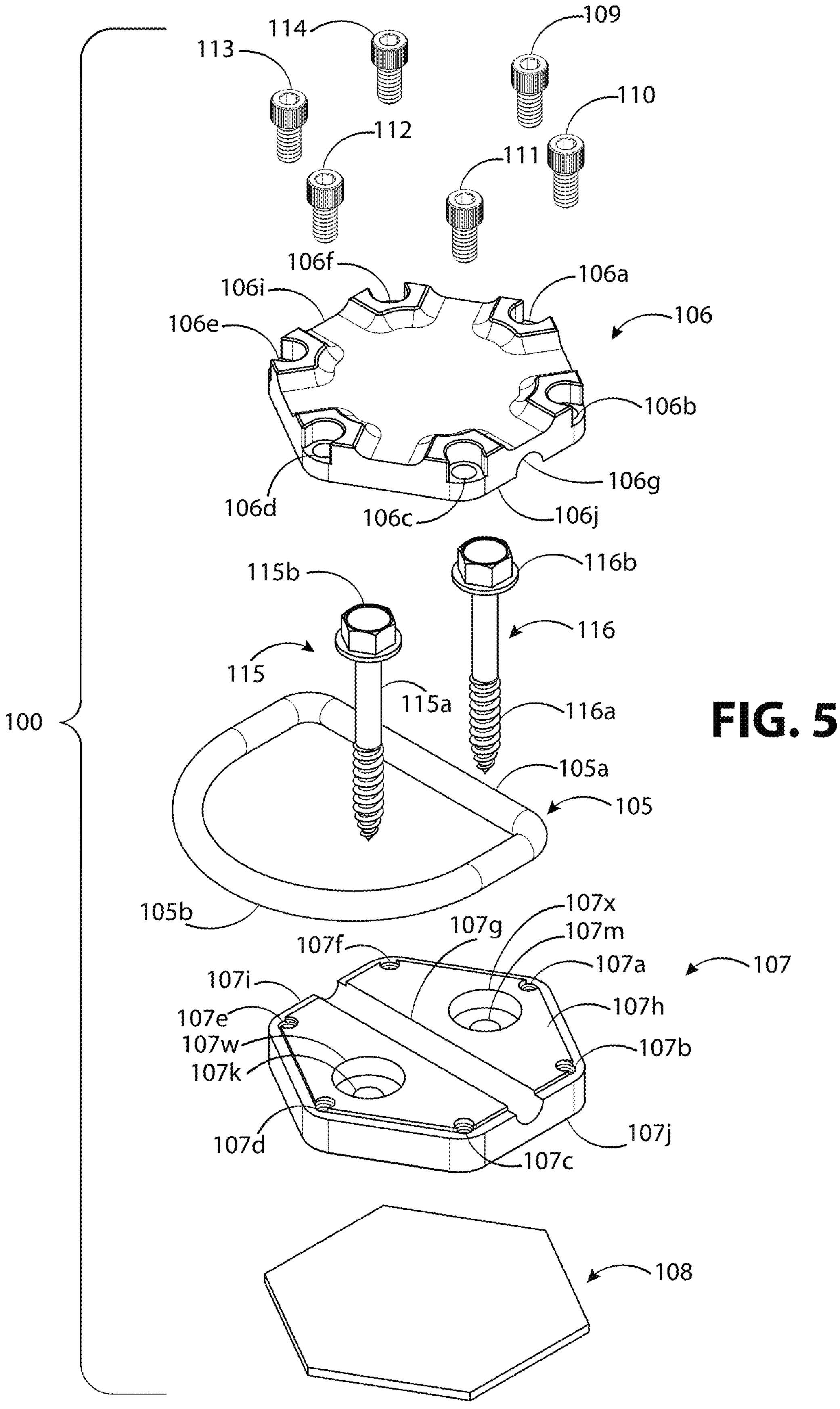
FIG. 5 illustrates, in exploded top isometric view, the roof safety anchor of FIG. 3.

Referring to FIGS. 3-5, roof safety anchor 100 may include the D-ring 105, a lid 106, base 107, gasket 108, and one or more threaded fasteners. For example, FIGS. 3 and 5 illustrate the threaded fasteners 109, 110, 111, 112, 113, 114 securing the lid 106 to the base 107. Referring to FIG. 5, portions of threaded fasteners 109, 110, 111, 112, 113, 114 pass through apertures 106*a*, 106*b*, 106*c*, 106*d*, 106*e*, 106*f* in the lid 106, respectively. Threaded apertures 107*a*, 107*b*, 107*c*, 107*d*, 107*e*, 107*f* in the base 107, receive and threadedly secure the threaded fasteners 109, 110, 111, 112, 113, 114, respectively. Apertures 106*a*, 106*b*, 106*c*, 106*d*, 106*e*, 106*f* typically are unthreaded to allow their respective threaded fasteners to pass through the lid freely.

Figure 6:
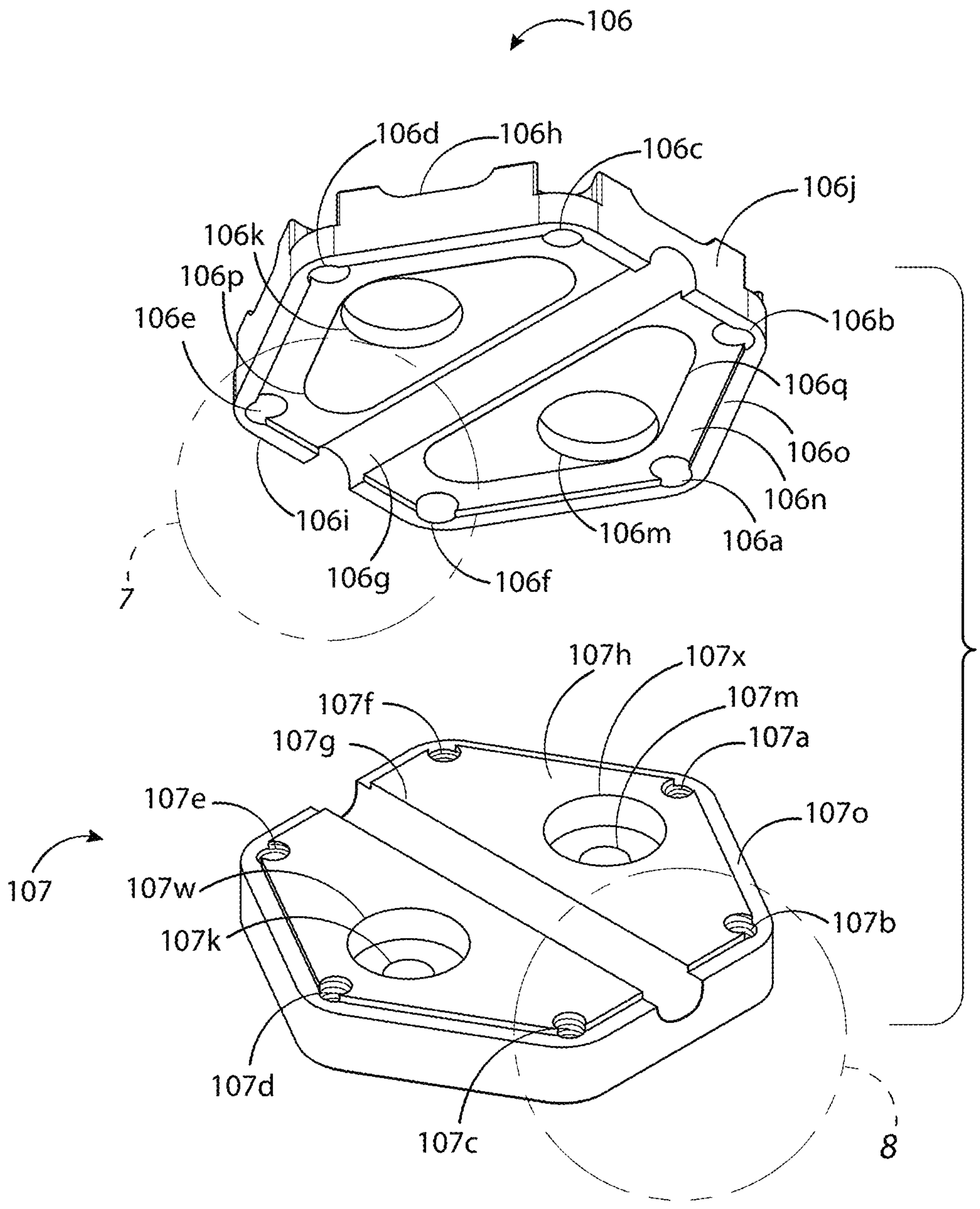
FIG. 6 illustrates, an exploded view of the roof safety anchor of FIG. 3 with the lid in bottom isometric view, the base in top isometric view and with components other than the lid and base removed for clarity.

Continuing to refer to FIG. 5, in addition to enclosing the D-ring 105, the lid 106 and the base 107 also enclose the threaded roof fasteners 115, 116. The lid 106 covers the roof fastener heads 115*b*, 116*b*. This arrangement helps to maintain a watertight seal. The roof fastener bodies 115*a*, 116*a* are received by and pass through apertures 107*k*, 107*m*, respectively, in the base 107. Upper surrounds 107*w*, 107*x* may optionally form a closed perimeter around apertures 107*k*, 107*m*, respectively. The upper surrounds 107*w*, 107*x* may be recessed in the base top surface 107*h* to seat the roof fastener heads 115*b*, 116*b*, respectively. Apertures 107*k*, 107*m* may be unthreaded, which allows roof fastener bodies 115*a*, 116*a*, respectively, to pass through freely. FIG. 6 also shows upper surrounds 107*w*, 107*x* surrounding the apertures 107*k*, 107*m*, respectively.

Figure 7:
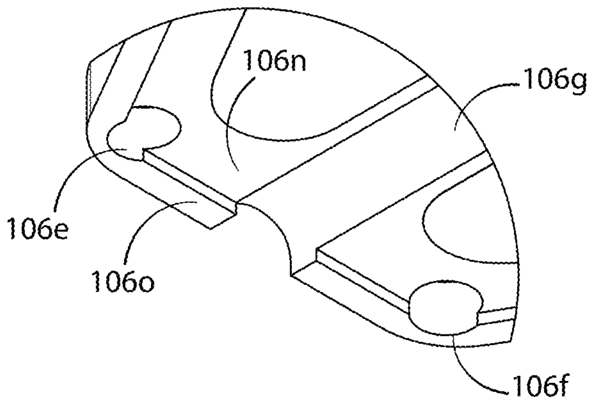
FIG. 7 illustrates an enlarged portion of the lid of FIG. 6 showing the relief, groove, and lid rim in greater detail.

Referring to FIG. 5, the D-ring 105 includes a first D-ring portion 105*a* that seats in groove 107*g* indented in the base top surface 107*h* and a second D-ring portion 105*b* that extends beyond the base 107. The groove 107*g* extends through opposite sides, sides 107*i*, 107*j*, of the base 107. The first D-ring portion 105*a* also seats in groove 106*g* of lid 106. FIGS. 6 and 7 illustrate the groove 106*g*. Referring to FIGS. 6 and 7, the groove 106*g* is indented in the lid bottom surface 106*n* of the lid 106. Referring to FIG. 6, the groove 106*g* extends through opposite sides, sides 106*i*, 106*j*, of the lid 106.

Referring to FIG. 1, the roof safety anchor 100 may include structural elements that keep water away from the threaded roof fasteners. If water penetrates the threaded roof fasteners, the roof safety anchor 100 can include additional structural elements that keep water from penetrating the roof 101. These structural elements can be divided into three water-abatement strategies. The first strategy includes structural elements on the lid bottom surface and base top surface that prevent water from entering the roof safety anchor. If water does enter, these structural elements will also shed water away from the threaded roof fasteners. The second strategy includes structural features in the base bottom surface combined with a waterproof gasket to prevent water that has infiltrated the roof safety anchor from penetrating the roof. The third strategy includes exterior structural elements, such as the shape of the roof safety anchor, and water-shedding portions surrounding the threaded fasteners, that redirect water away from entry points in the roof safety anchor.

FIGS. 6-11 illustrate the first water-abatement strategy. Referring to FIG. 6, the lid 106 may include a lid rim 106*o* that extends below the lid bottom surface 106*n*. The groove 106*g* creates apertures on opposite sides of the lid, sides 106*i*, 106*j*. Apertures 106*a*, 106*b*, 106*c*, 106*d*, 106*e*, 106*f* may extend through the lid bottom surface 106*n* and may also extend through a portion of the interior wall of the lid rim 1060. FIG. 7 shows the relationship between the apertures 106*e*, 106*f*, lid rim 1060, lid bottom surface 106*n*, and groove 106*g* in more detail.

Figure 8:
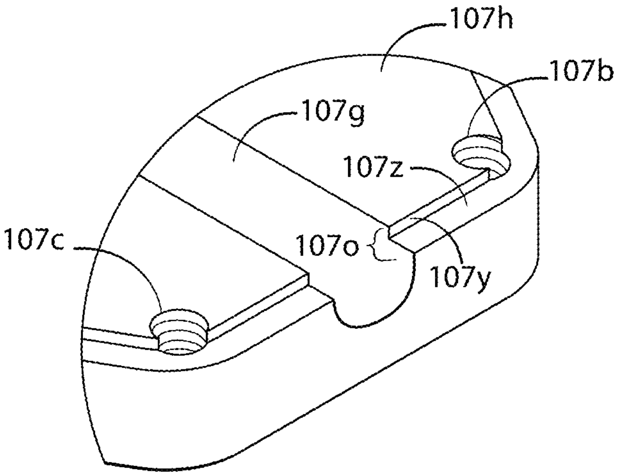
FIG. 8 illustrates an enlarged portion of the base of FIG. 6 showing the flanged lip, base top surface, and groove in greater detail.

Referring to FIG. 6, the base 107 may include a flanged lip 107*o* that seats the lid rim 1060. The flanged lip 107*o* may be structured as a step-shaped recess or rabbet. Referring to FIG. 8, the flanged lip 107*o* may include a side wall 107*y* that extends upward from the flanged lip base 107*z* toward the base top surface 107*h*. Referring to FIG. 6, the base top surface 107*h* can include threaded apertures 107*a*, 107*b*, 107*c*, 107*d*, 107*e*, 107*f*, which can be threaded blind apertures. Referring to FIG. 8, these threaded blind apertures may terminate into the side wall 107*y*. This creates an opening in the side wall 107*y* for water to flow. Water leakage from the threaded fasteners into the threaded blind apertures will overflow from the openings in the side wall 107*y* into the flanged lip 1070. The flanged lip 1070, being lower than the base top surface 107*h*, directs water away from the interior of the base to the outside of the roof safety anchor either directly or via the groove 107*g*. FIG. 8 shows the relationship between the flanged lip 107*o*, the groove 107*g*, threaded apertures 107*b*, 107*c*, and base top surface 107*h* in greater detail.

Referring again to FIG. 6, the lid 106 can include a pair of surrounds, surrounds 106*p*, 106*q* extending upward from the lid bottom surface 106*n*. Within the surrounds 106*p*, 106*q* are the recessed portions 106*k*, 106*m*, respectively. These recessed portions encapsulate the heads of the threaded roof fasteners and help shield them from water.

Figure 9:
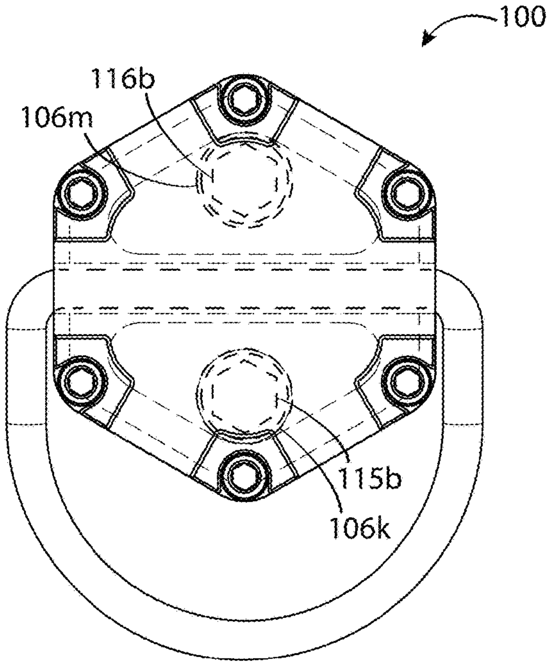
FIG. 9 illustrates, in top plan view, the roof safety anchor of FIG. 3 that includes threaded roof fasteners, where the dashed lines represents surfaces on the bottom of the lid hidden from view
Figure 10:
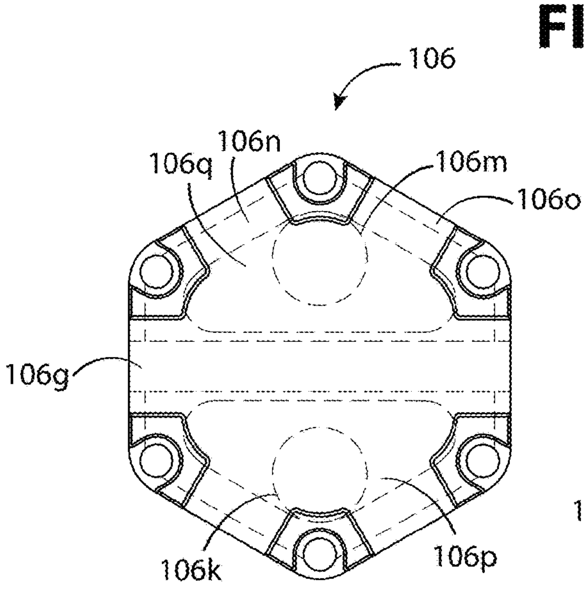
FIG. 10 illustrates, in top plan view, the lid of the roof safety anchor of FIG. 3 where dashed lines represents surfaces on the bottom of the lid hidden from view.
Figure 11:
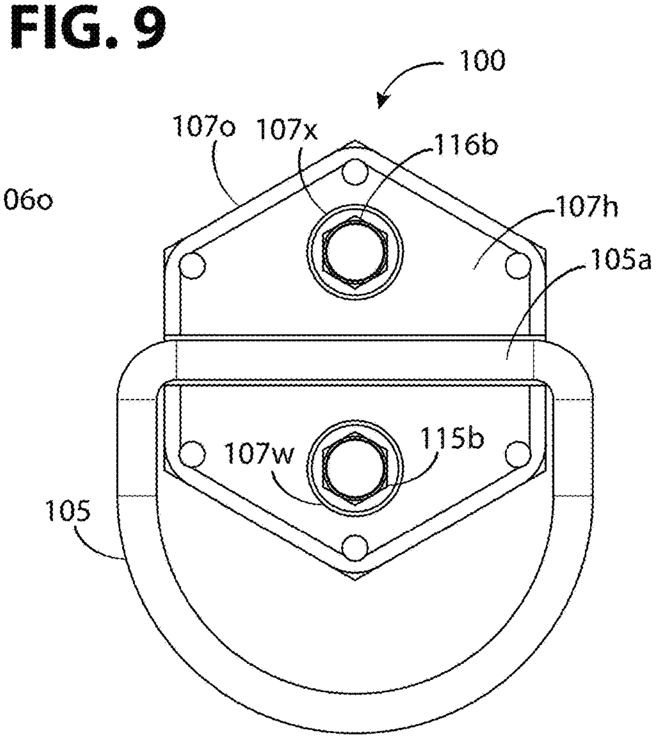
FIG. 11 illustrates, in top plan view, the roof safety anchor of FIG. 3 with the cover removed.

FIG. 9 illustrates a top view of the roof safety anchor 100 with portions hidden from view shown as broken lines. FIG. 9 illustrates recessed portions 106*k*, 106*m* surrounding the roof fastener heads 115*b*, 116*b*, respectively. FIG. 10 shows a top view of the lid 106 with the lid bottom surface 106*n*, lid rim 1060, surrounds 106*p*, 106*q*, recessed portions 106*k*, 106*m*. FIG. 11 shows the roof safety anchor 100 with the lid removed showing the first D-ring portion 105*a* of D-ring 105, base top surface 107*h*, upper surrounds 107*w*, 107*x*, flanged lip 107*o*, roof fastener heads 115*b*, 116*b*. FIGS. 10 and 11 together illustrate that the lid rim 106*o* is sized and structured to fit directly over the flanged lip 107*o* and recessed portions 106*k*, 106*m* are sized and positioned to fit directly over the upper surrounds 107*w*, 107*x*, respectively.

Figure 12:
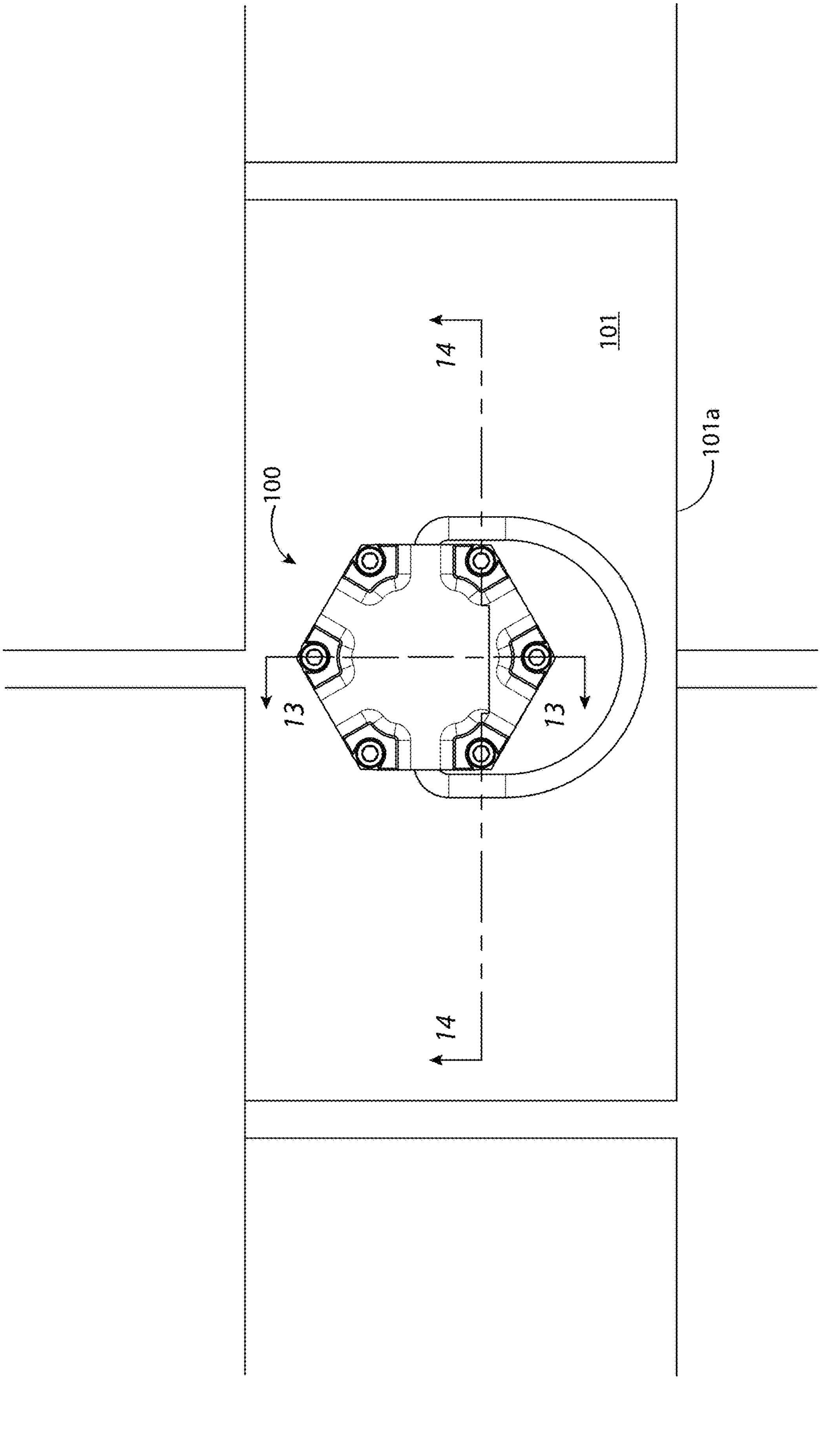
FIG. 12 illustrates, in top plan view, the roof safety anchor of FIG. 3 attached to a roof.
Figure 13:
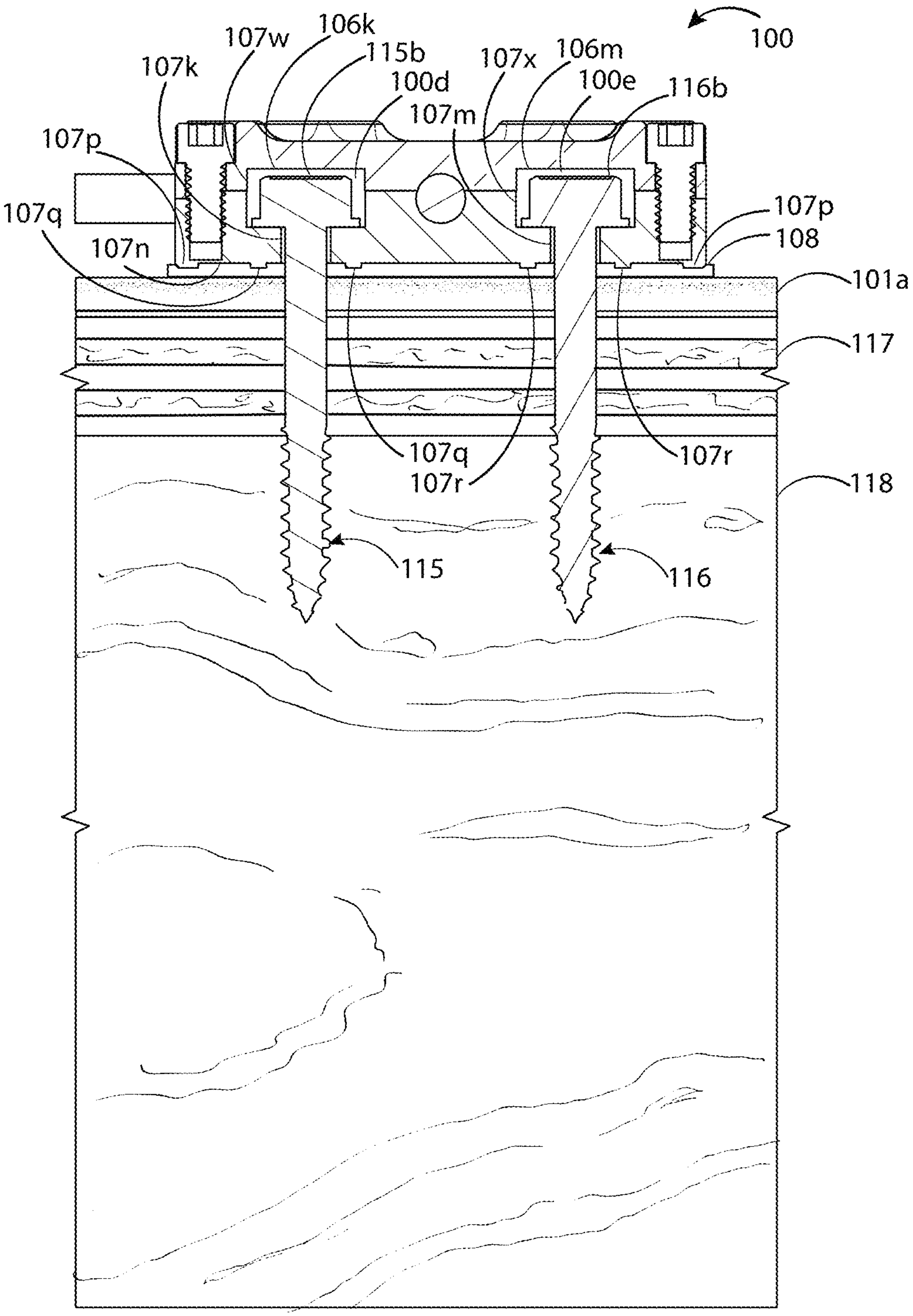
FIG. 13 illustrates a section view of the roof safety anchor and roof taken along section lines 13-13 in FIG. 12.
Figure 14:
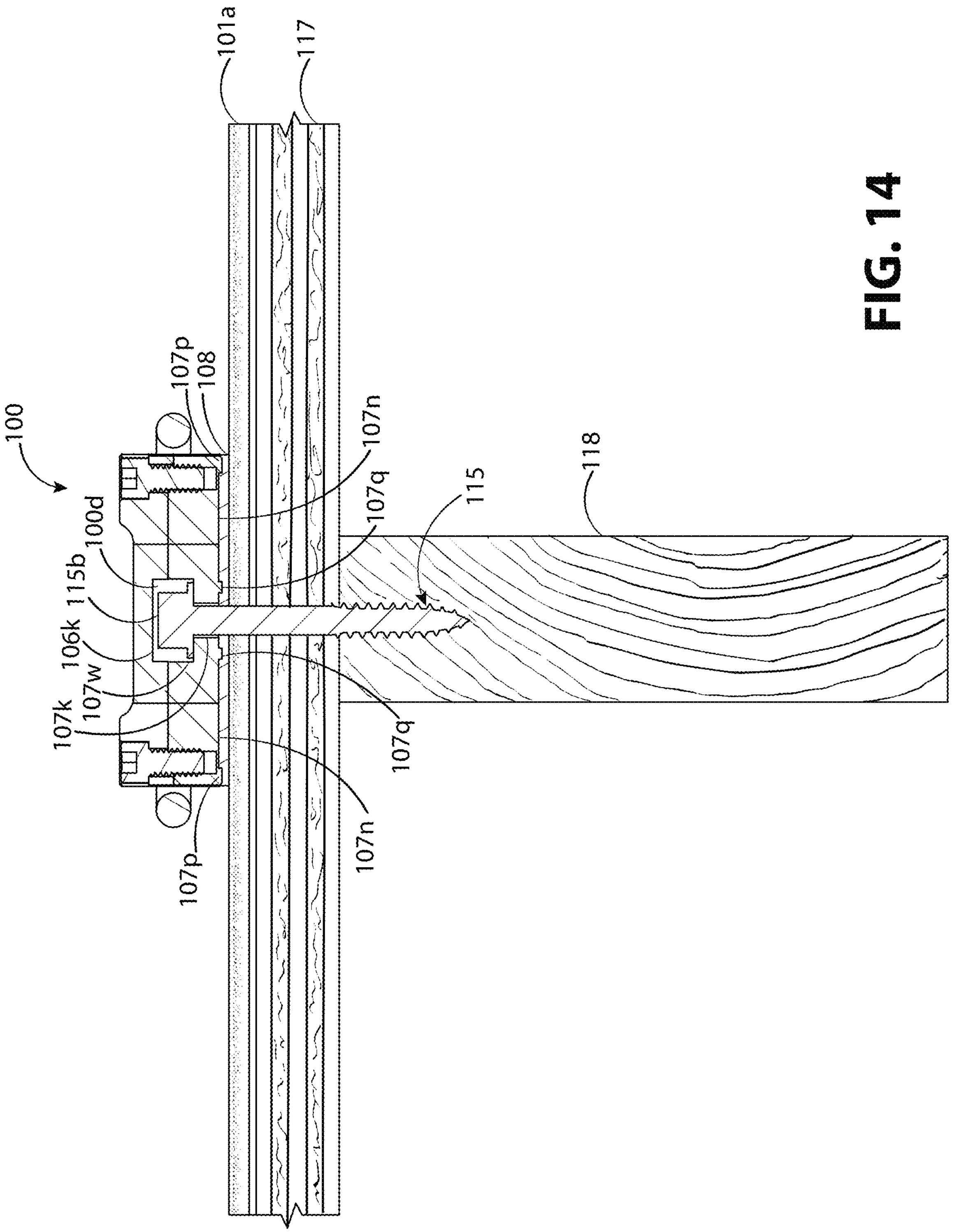
FIG. 14 illustrates a section view of the roof safety anchor and roof taken along section lines 14-14 in FIG. 12.

FIGS. 13 and 14, which are section views of the roof safety anchor 100 and roof 101 of FIG. 12. FIGS. 13 and 14 illustrates how the recessed portion 106*k* and upper surround 107*w* form a cavity 100*d* that surrounds roof fastener head 115*b* and enhances resistance to water infiltration. Referring to FIG. 13, likewise, the recessed portion 106*m* and the upper surround 107x form a cavity 100e that surrounds roof fastener head 116b and enhances resistance to water infiltration.

Figure 15:
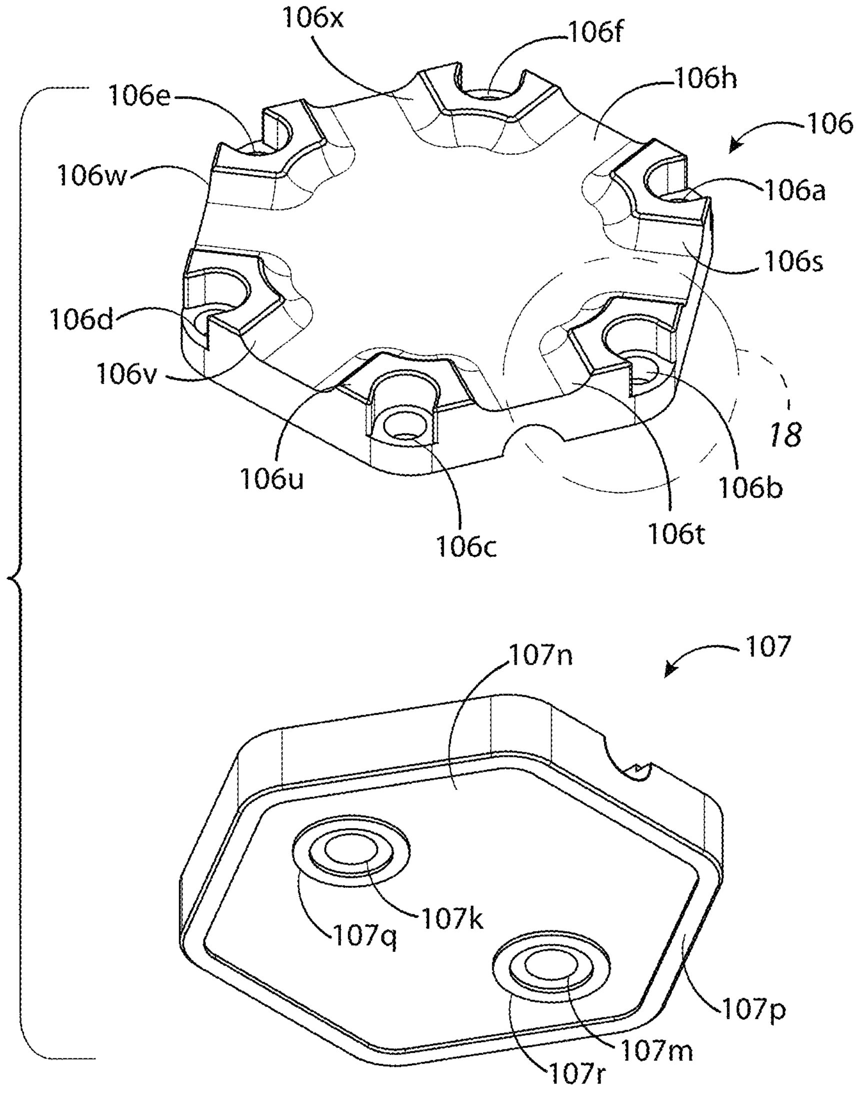
FIG. 15 illustrates, an exploded view of the roof safety anchor of FIG. 3 with the lid in top isometric view, the base in bottom isometric view and with components other than the lid and base removed for clarity.

FIG. 15 illustrates the lid 106, in top isometric view, exploded away from the base 107, in bottom isometric, with the other components removed for clarity. The base bottom surface 107n forms a recess with respect to its rim or perimeter edge, the base rim 107p. Lower surrounds 107q, 107r project downward from the base bottom surface 107n and form closed perimeters around the apertures 107k, 107m, respectively. The apertures 107k, 107m may be counterbored within their respective surrounds. The base rim 107p and lower surrounds 107q, 107r may lie in the same plane. These structures, in combination with the gasket 108 of FIGS. 13 and 14, can help to reduce water penetration in the roof.

Referring to FIGS. 13 and 14, the gasket 108 seats against the roof shingle 101a, around the base rim 107p, into the recess within the base bottom surface 107n, and seats in the recess between the aperture 107k and the lower surround 107q. Referring to FIG. 13, the gasket 108 also seats in the recess between the aperture 107m and the lower surround 107r. Referring to FIGS. 13 and 14, with the threaded roof fastener 115 engaging the roof decking 117 and roof structural member 118, additional material within the gasket 108 may be pushed up into the recess between the apertures 107k and the lower surround 107q. Additional gasket material may also be pushed up into the space between aperture 107k and threaded roof fastener 115. Likewise, in FIG. 13, additional material within the gasket 108 may be pushed up into the recess between the apertures 107m and the lower surround 107r and the space between aperture 107m and threaded roof fastener 116. Waterproofing is enhanced by the gasket material filling the voids between the threaded roof fasteners 115, 116 and other elements.

Figure 16:
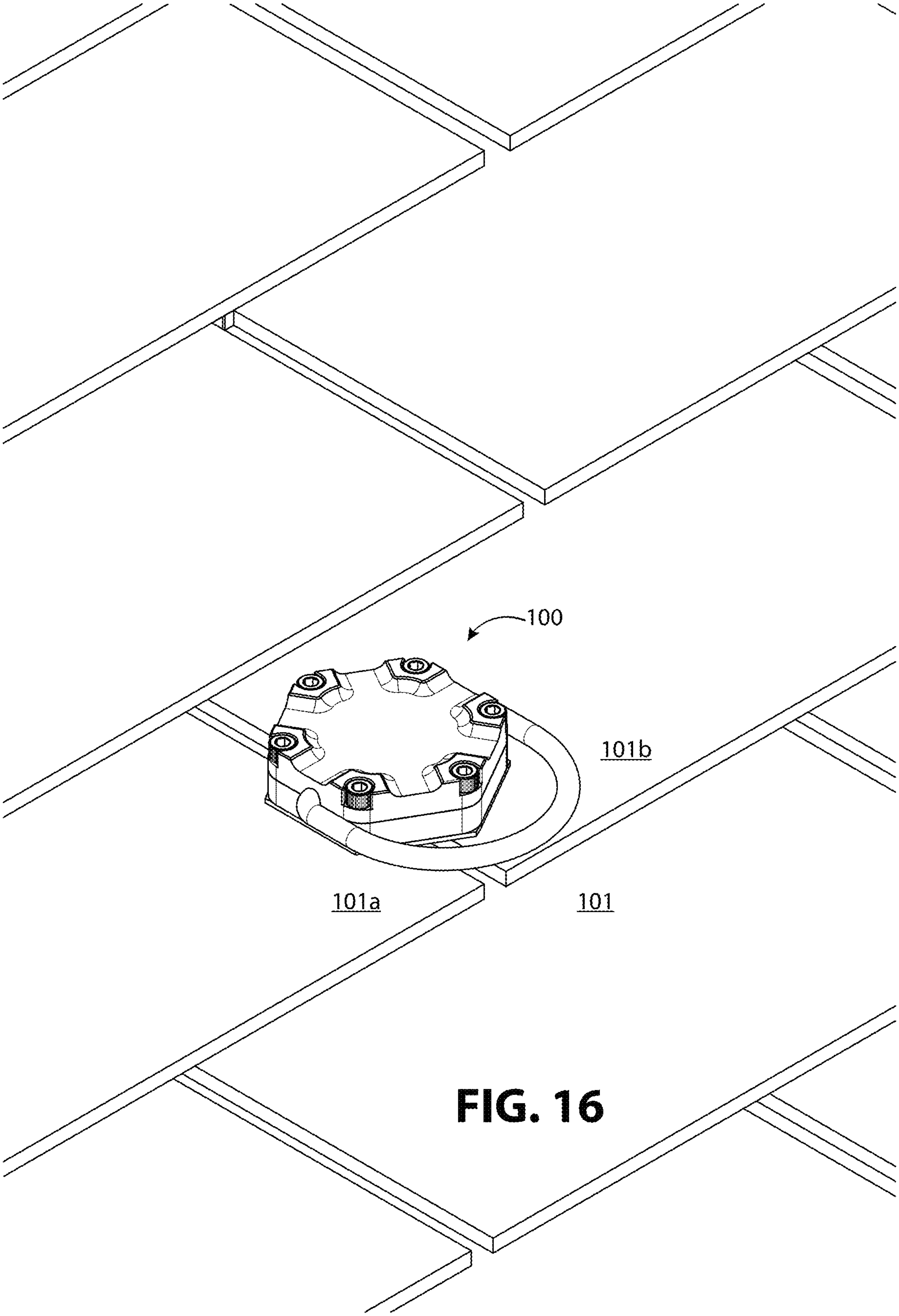
FIG. 16 illustrates an example of how the roof safety anchor can be placed across two shingles.

On a shingled roof, an installer would typically place the roof safety anchor over one roof shingle, such as roof shingle 101a, as illustrated in FIG. 12. The second water mitigation strategy described above, which uses the combination of the gasket 108 and structural features in base 107 allow for placement between shingles. For example, in FIG. 16, the installer has positioned the roof safety anchor 100 between the roof shingle 101a and the roof shingle 101b on roof 101.

Figure 17:
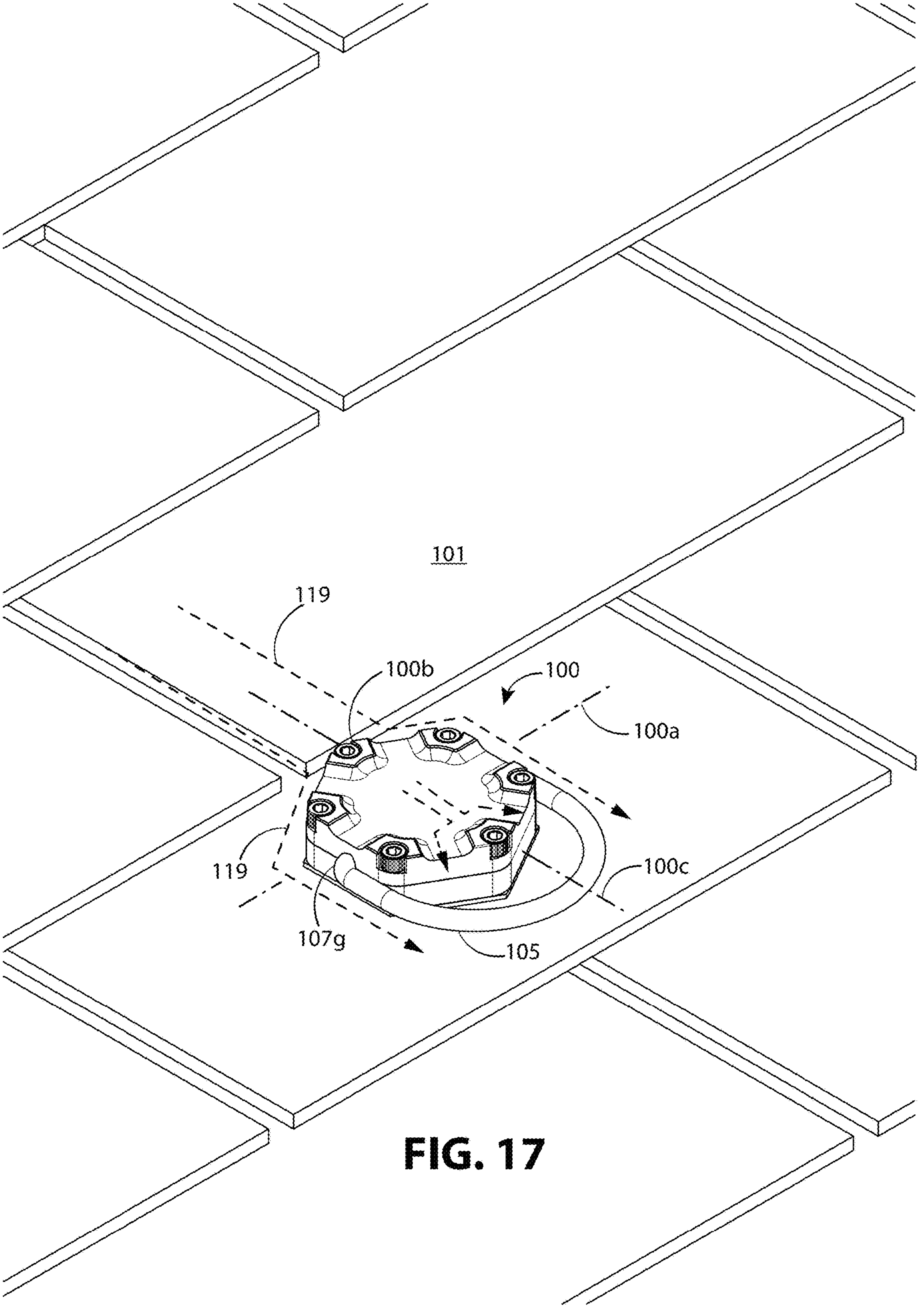
FIG. 17 illustrates an example of how the roof safety anchor can shed water.

FIG. 17 illustrates the third water mitigation strategy. Water, typically water from rain, flows downward on the roof 101. The even dashed lines depict the water flow 119. An installer typically secures the roof safety anchor 100 with a rotational axis 100a of the D-ring 105 so that both threaded roof fasteners engage the roof structural member of FIGS. 13 and 14. Continuing to refer to FIG. 17, this configuration maximizes pull strength. It also minimizes water infiltration from where the groove 107g meets the D-ring 105 because the gap between the groove 107g and the D-ring 105 is perpendicular to the water flow 119. As illustrated, the roof safety anchor 100 includes sides forming a vertex 100b or peak along an axis 100c through the midline of the roof safety anchor 100 and perpendicular to the rotational axis 100a of the D-ring. The vertex 100b and downward-angled sides shed water like a peaked roof. Referring to FIG. 5, the roof safety anchor 100 may be shaped so that threaded fasteners 109, 110, 111, 112, 113, 114 are positioned at corresponding vertices. The roof safety anchor throughout this disclosure is shown as hexagonal, however other polygon shapes where a vertex of the roof safety anchor can be positioned along a midline that is perpendicular to the rotational axis of the D-ring can also have similar water-shedding features. For example, the roof safety anchor can be a pentagon, heptagon, or octagon. If this water-shedding feature is not important, the roof safety anchor can be any closed shape, such as a circular or non-circular cylinder.

Figure 18:
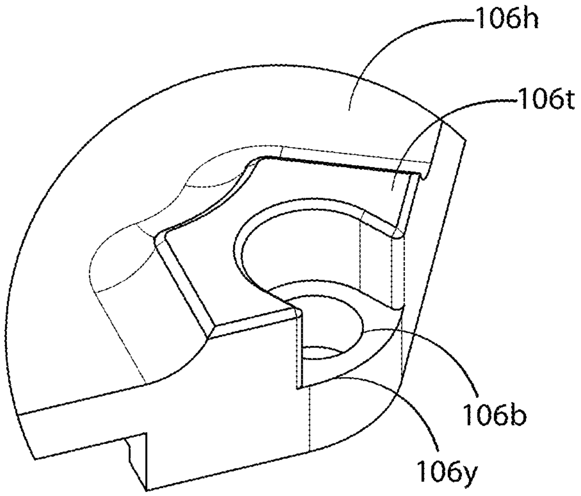
FIG. 18 illustrates an enlarged portion of FIG. 15 showing a water-shedding element in greater detail.
Figure 19:
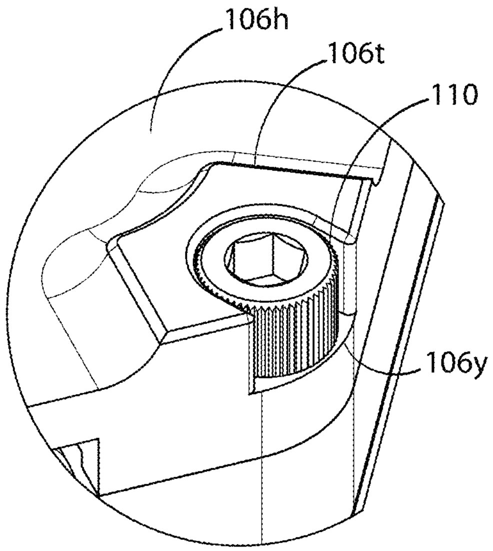
FIG. 19 illustrates an enlarged portion of FIG. 3 showing a water-shedding element in greater detail.

Referring to FIG. 15, the roof safety anchor 100 may optionally include water-shedding portions 106s, 106t, 106u, 106v, 106w, 106x partially surrounding the apertures 106a, 106b, 106c, 106d, 106e, 106f, respectively. The water-shedding portions 106s, 106t, 106u, 106v, 106w, 106x extend upward from the lid top surface 106h. FIG. 18 illustrates an enlarged portion of FIG. 15 showing the water-shedding portion 106t in more detail. FIG. 19 illustrates water-shedding portion 106t surrounding threaded fastener 110. Referring to FIGS. 18 and 19, the water-shedding portion 106t surrounds aperture 106b (FIG. 18) and the threaded fastener 110 (FIG. 19) to the extent of the lid top surface 106h except for the lid top edge 106y to allow water drainage.

Typical Installation Method

Figure 20:
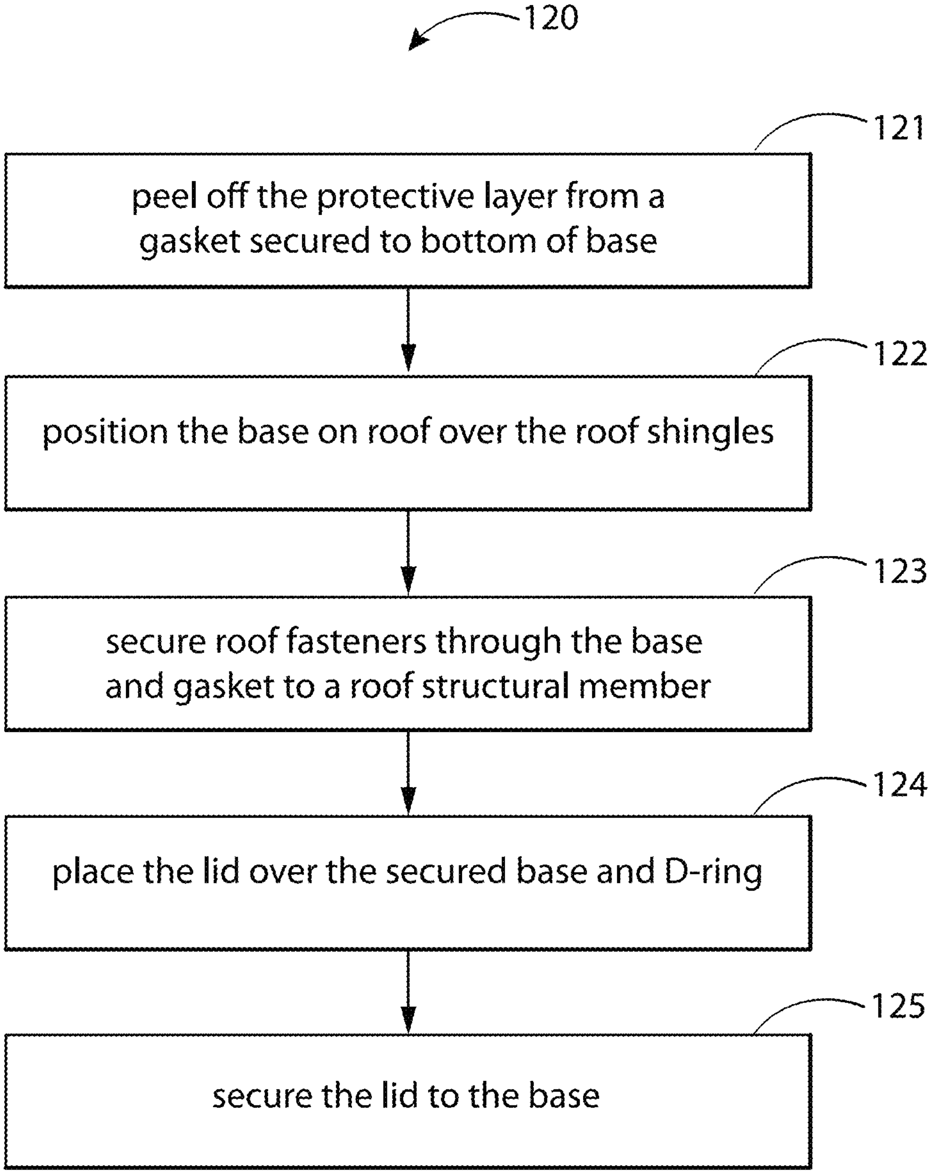
FIG. 20 illustrates a flow chart demonstrating a typical assembly sequence.
Figure 21A:
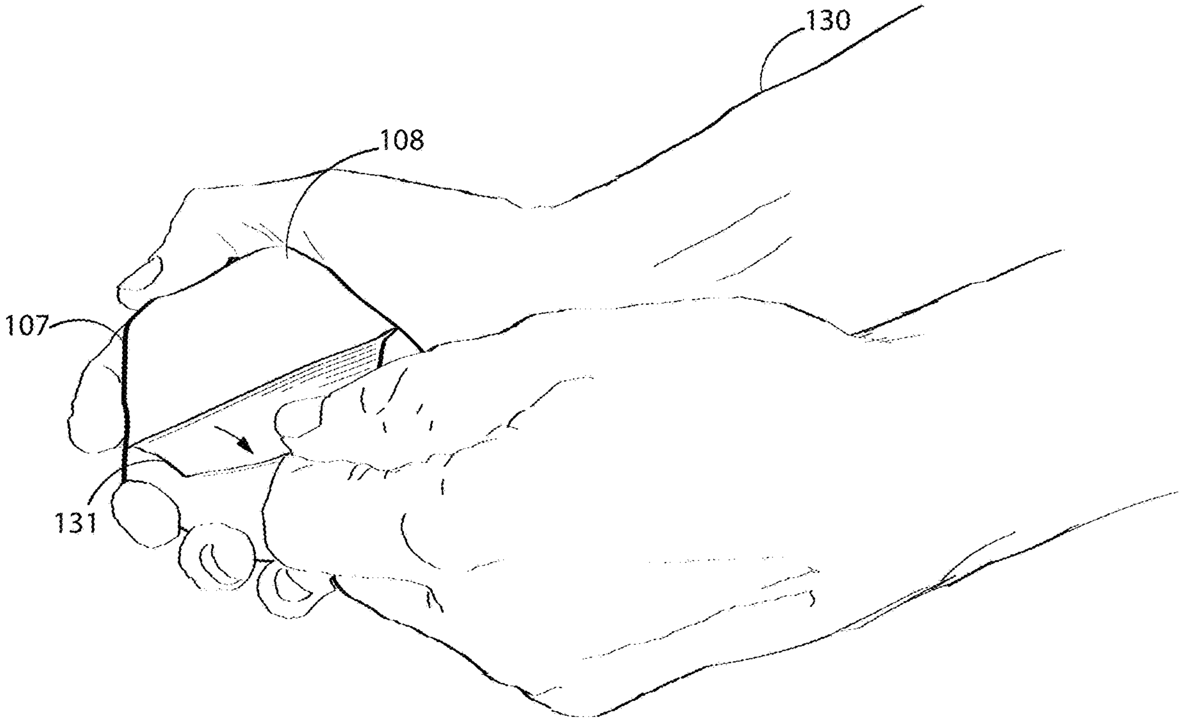
FIGS. 21A-21G illustrate the steps in the assembly sequence of FIG. 20.
Figure 21B:
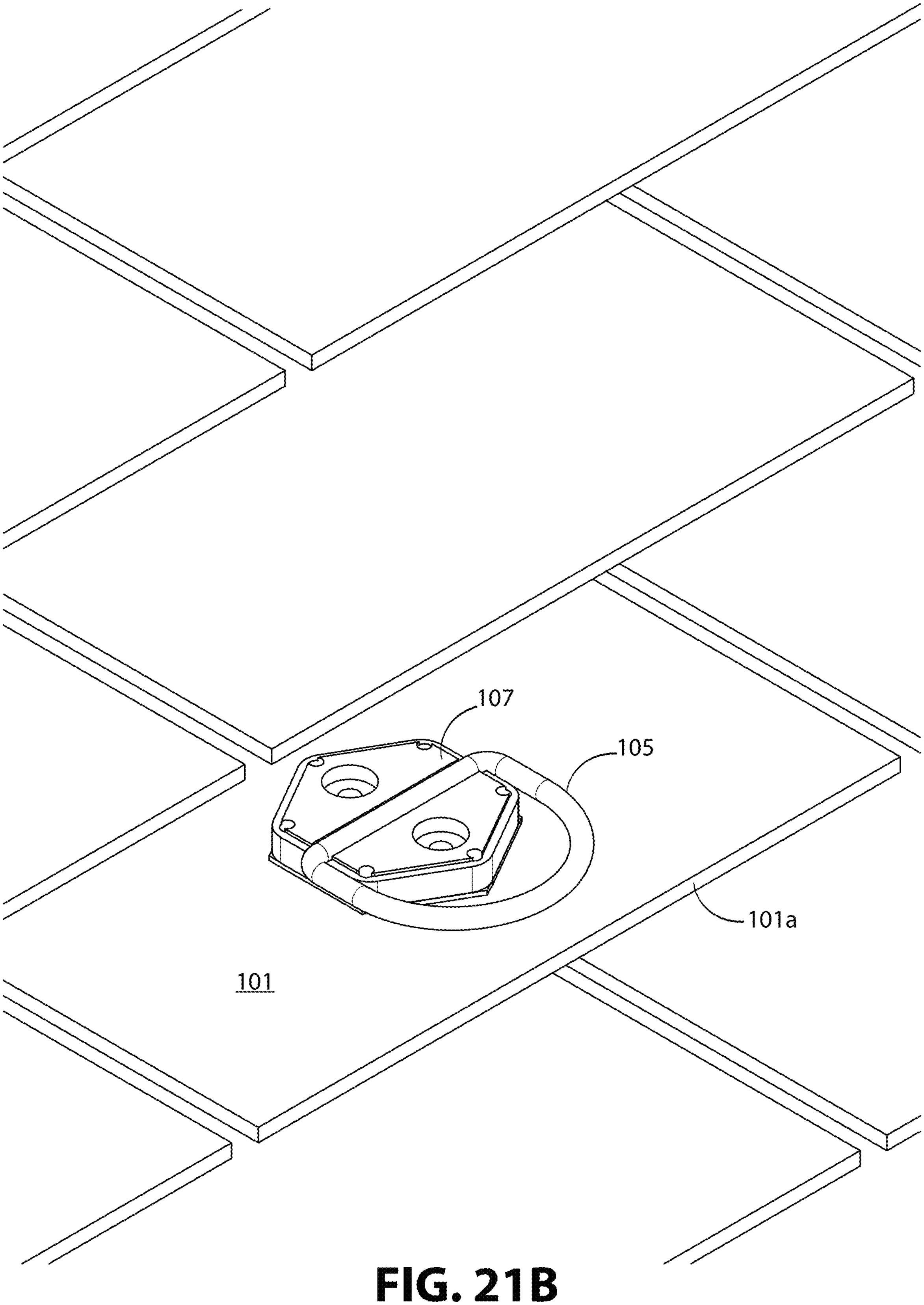
Figure 21C:
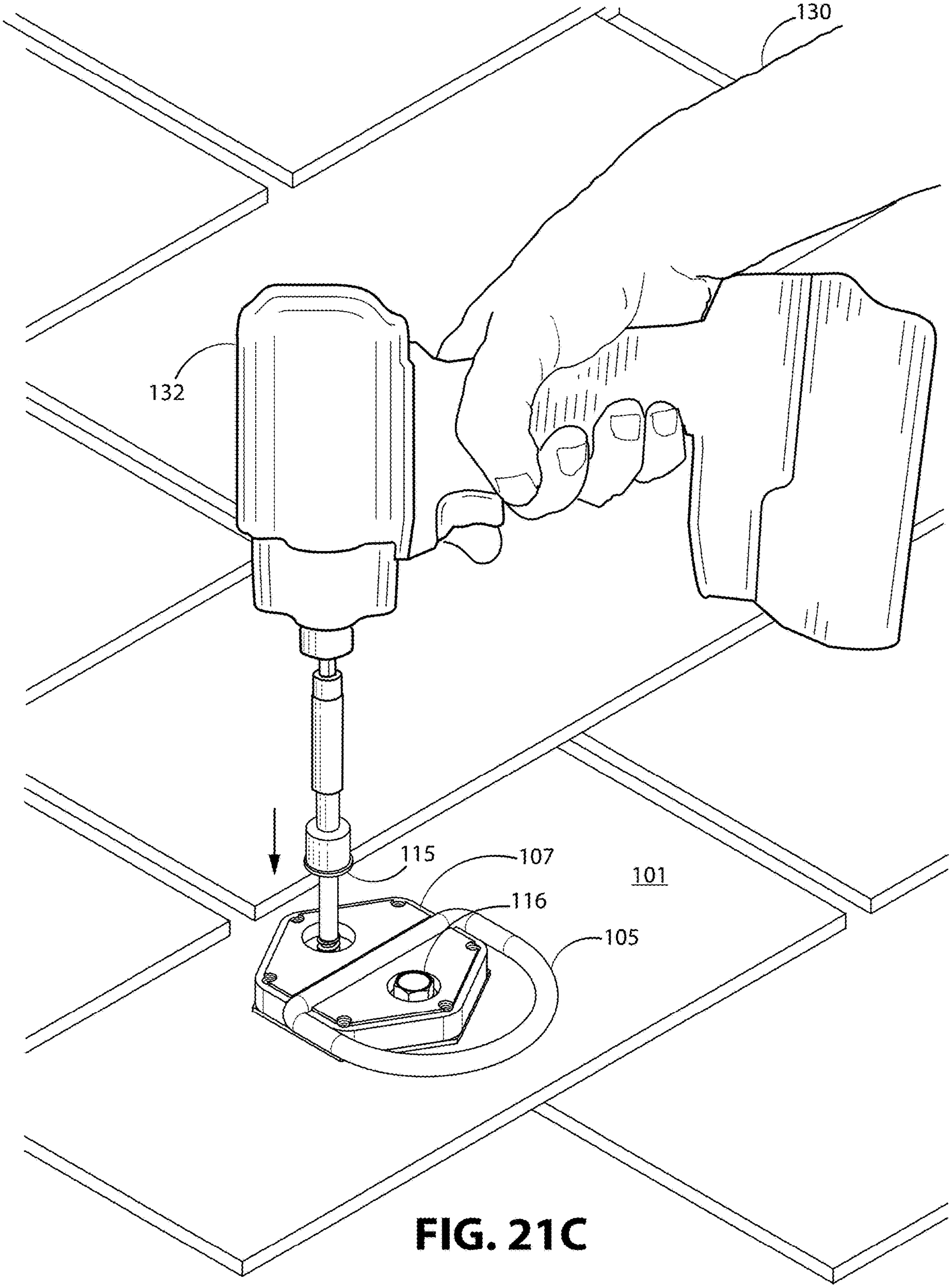
Figure 21D:
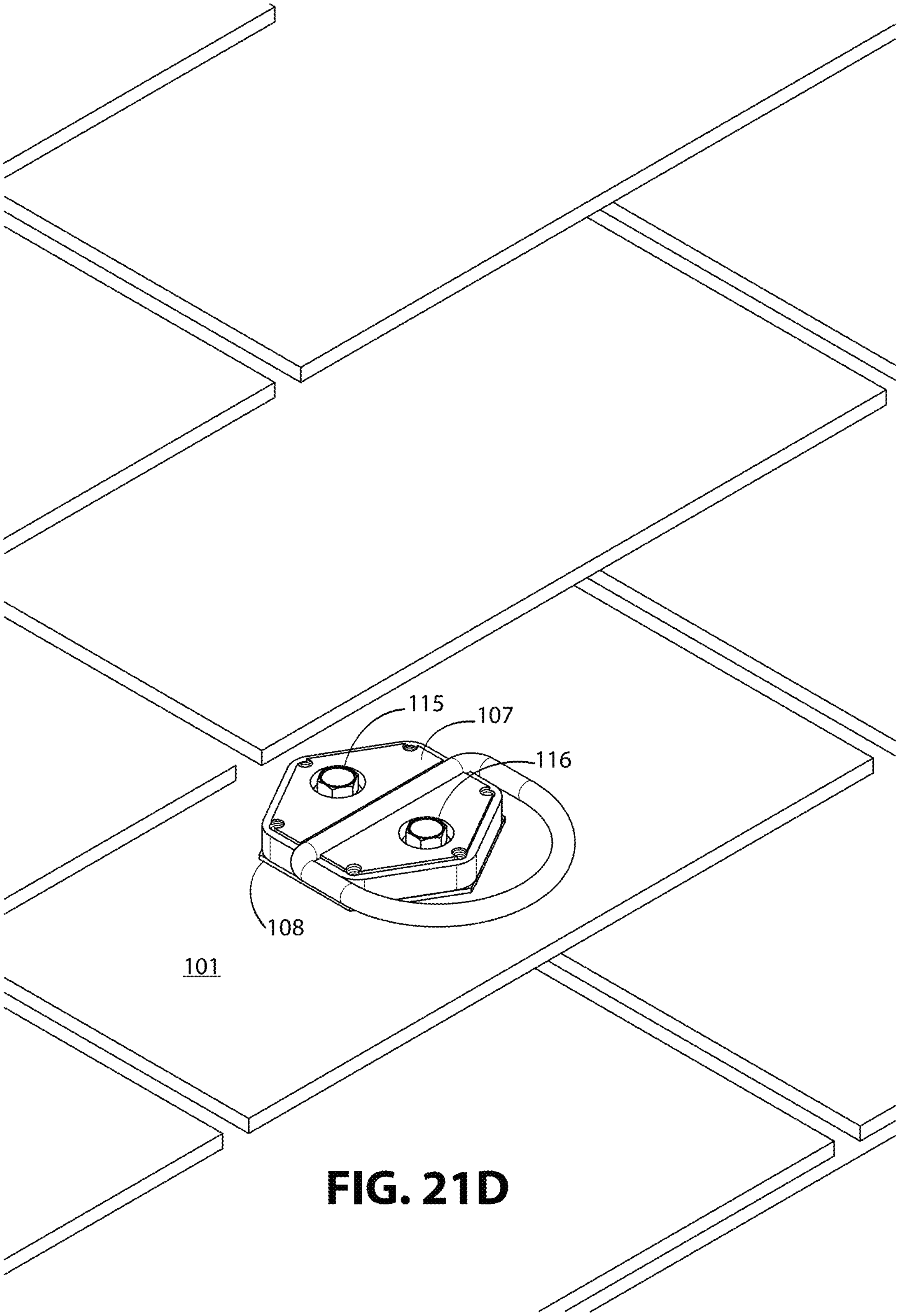
Figure 21E:
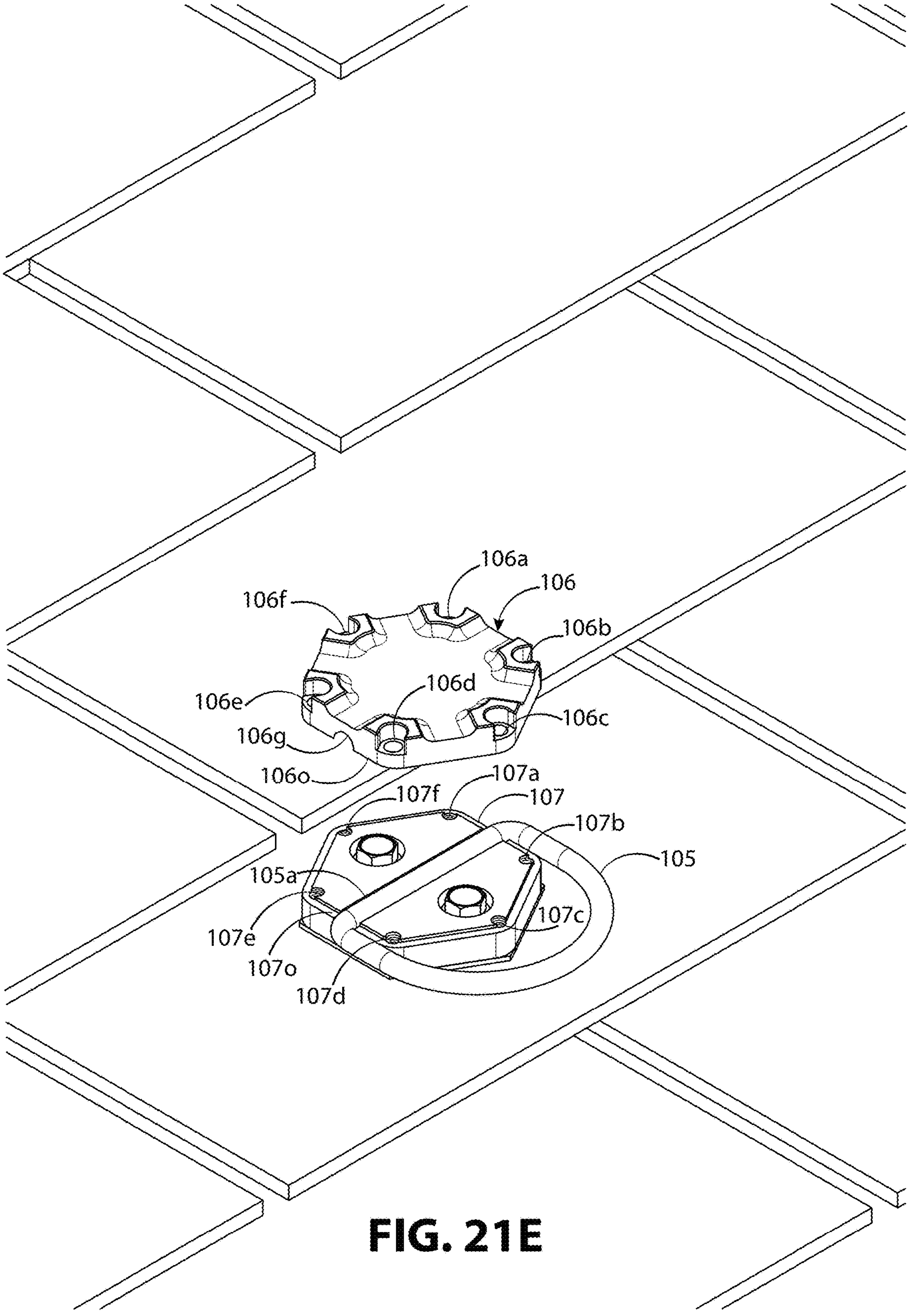
Figure 21F:
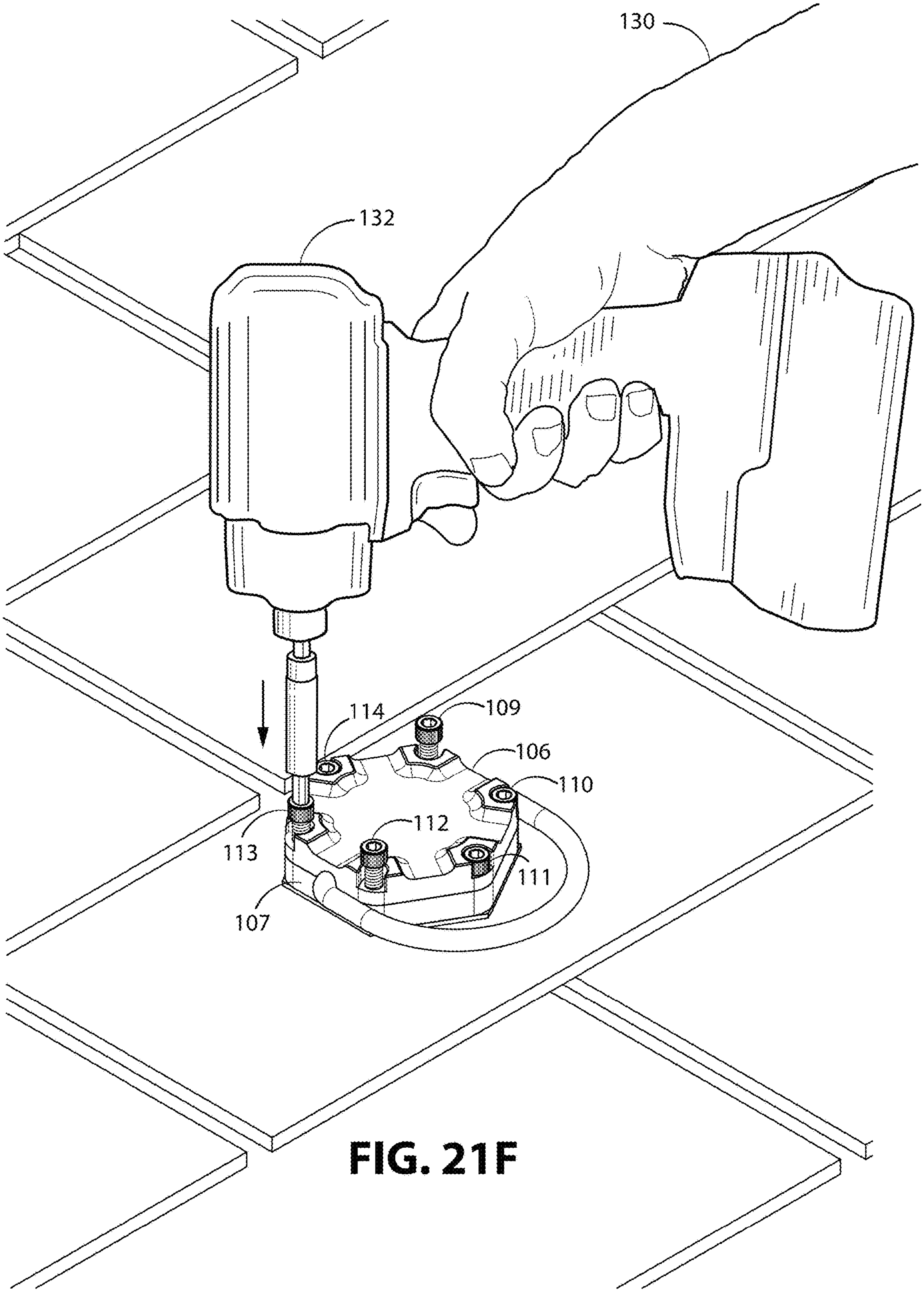
Figure 21G:
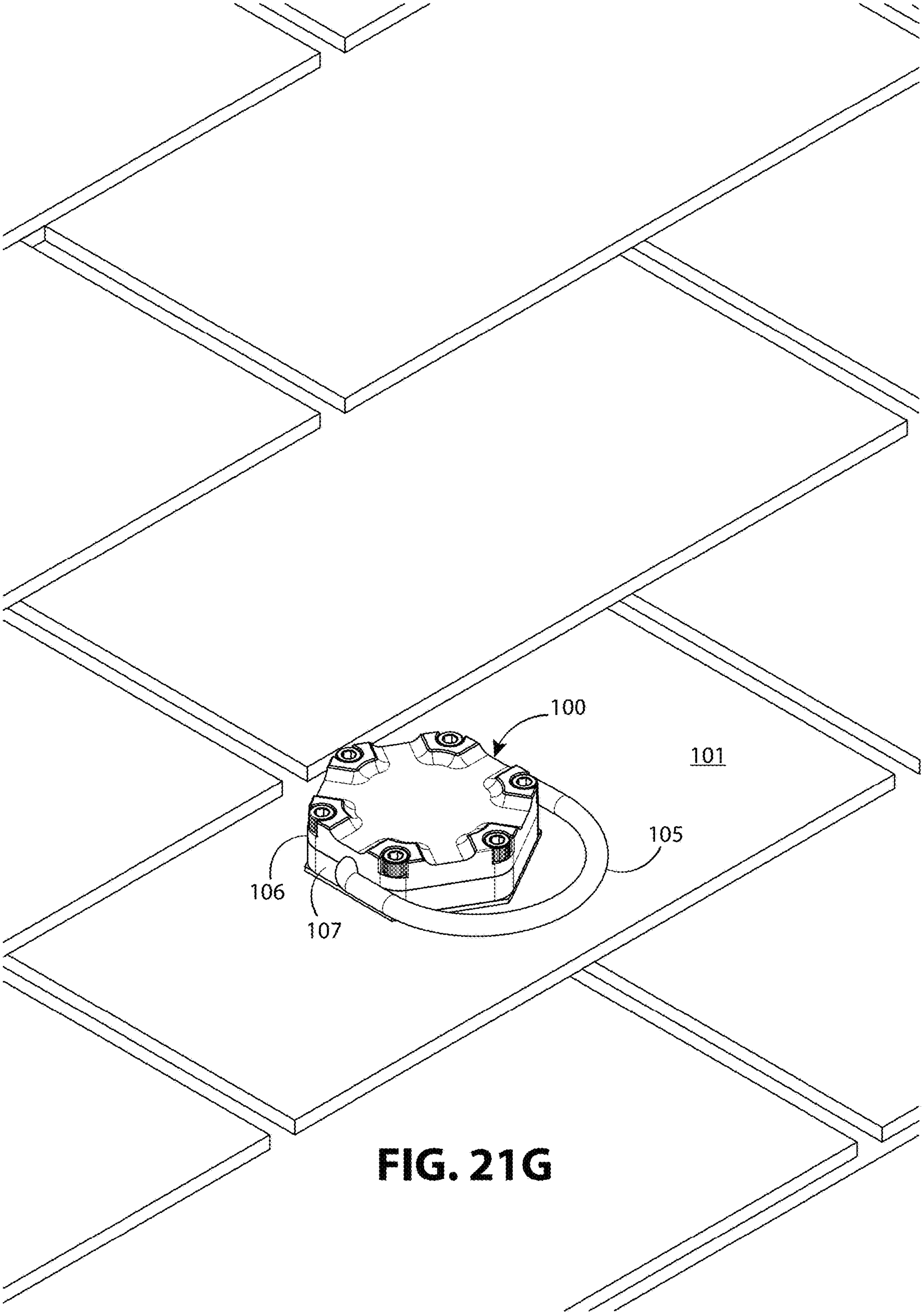

FIG. 20 illustrates a method 120 for either temporary or permanently installing the roof safety anchor 100 of FIG. 1. FIGS. 21A-21G illustrate the installation method. When referring to FIG. 20 together with any of FIGS. 21A-21G, installation steps refer to FIG. 20, and structural elements refer to the other referenced figures. Referring to FIG. 20 and FIG. 21A, the installer 130 determines where they will place the roof safety anchor. In step 121, the installer 130 peels the protective layer 131 from the back of gasket 108. The protective layer 131 is typically a paper or plastic backing. The protective layer 131 can be any material that protects the gasket 108 and the adhesive within the gasket 108 while still being removable. FIG. 21A shows the gasket 108 pre-secured to the bottom of the base 107. The gasket 108 is typically an elastomeric material, such as an elastomeric pad, with both waterproofing and adhesive properties. An example of such a material is butyl rubber tape, which typically includes a removable protective layer. Referring to FIGS. 20 and 21B, in step 122, the installer places the base 107 on the roof 101 over the roof shingles, for example roof shingle 101a. The installer may optionally seat the D-ring 105 in the base 107. Referring to FIGS. 20 and 21C, in step 123, the installer 130 secures the base 107 to the roof 101 by securing one or more threaded roof fasteners to a roof structural member. The roof structural member is typically a joist, purlin, beam, or top chord of a truss. In FIG. 21C, the installer uses a power tool 132 to install the threaded roof fasteners 115, 116 to the roof 101. The installer can alternatively use any tool, including hand tools, that provide enough torque to drive the threaded roof fasteners through the gasket 108, through the roof decking, and securely into the roof structure member. In this step, placement of the D-ring 105 is optional. FIG. 21D illustrates the result of step 123 with the threaded roof fasteners, in this example, threaded roof fasteners 115, 116, secured in place and the base 107 and gasket 108 secured to the roof 101. Referring to FIG. 20 and FIG. 21E, in step 124, with the base secured to the roof 101, the installer places the lid 106 over the base 107, making sure to align the groove 106g over the first D-ring portion 105a, aligning the apertures 106a, 106b, 106c, 106d, 106e, 106f with threaded apertures 107a, 107b, 107c, 107d, 107e, 107f, respectively, and aligning the lid rim 106o over the flanged lip 1070. In step 125 and FIG. 21F, the installer 130 secures the lid 106 to the base 107 by securing threaded fasteners 109, 110, 111, 112, 113, 114. FIG. 21G illustrates the completed installation with the roof safety anchor 100 secured to the roof 101. The D-ring 105 and threaded roof fasteners (hidden from view) are secured between the lid 106 and the base 107. The roof penetrations from the threaded roof fasteners watertight.

Additional Examples

Figure 28:
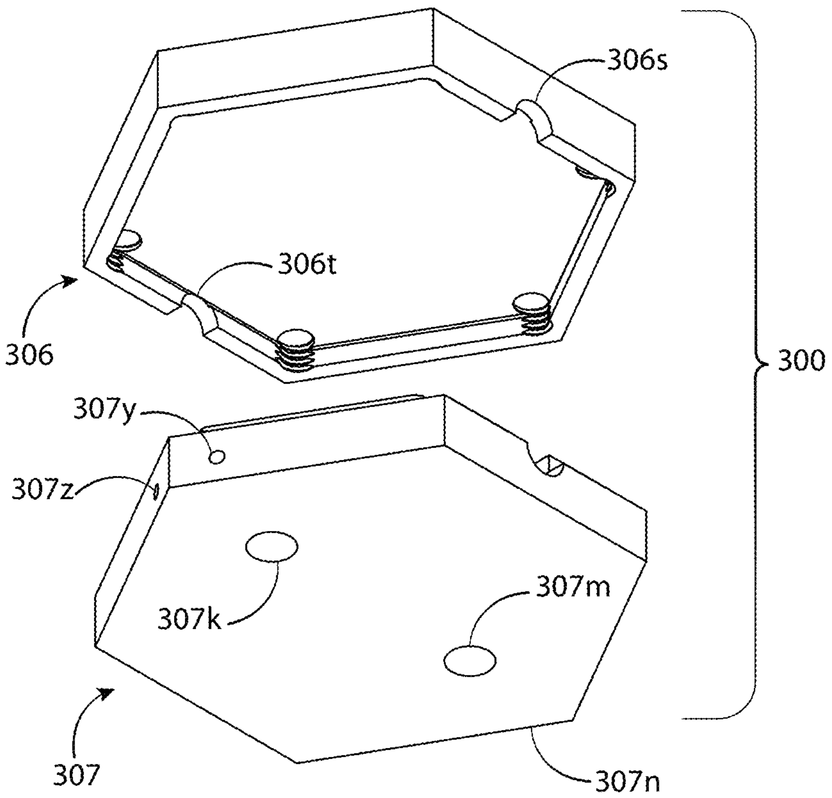
FIG. 28 illustrates an exploded view of a third example of a roof safety anchor, with the lid in bottom isometric view, the base in top isometric view, and with components other than the lid and base removed for clarity.
Figure 29:
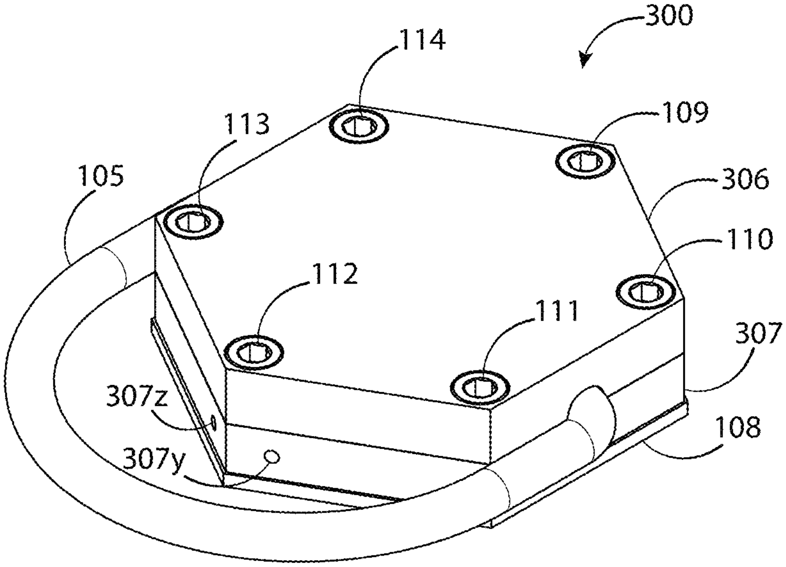
FIG. 29 illustrates a top isometric view of the roof safety anchor of FIG. 28.
Figure 30:
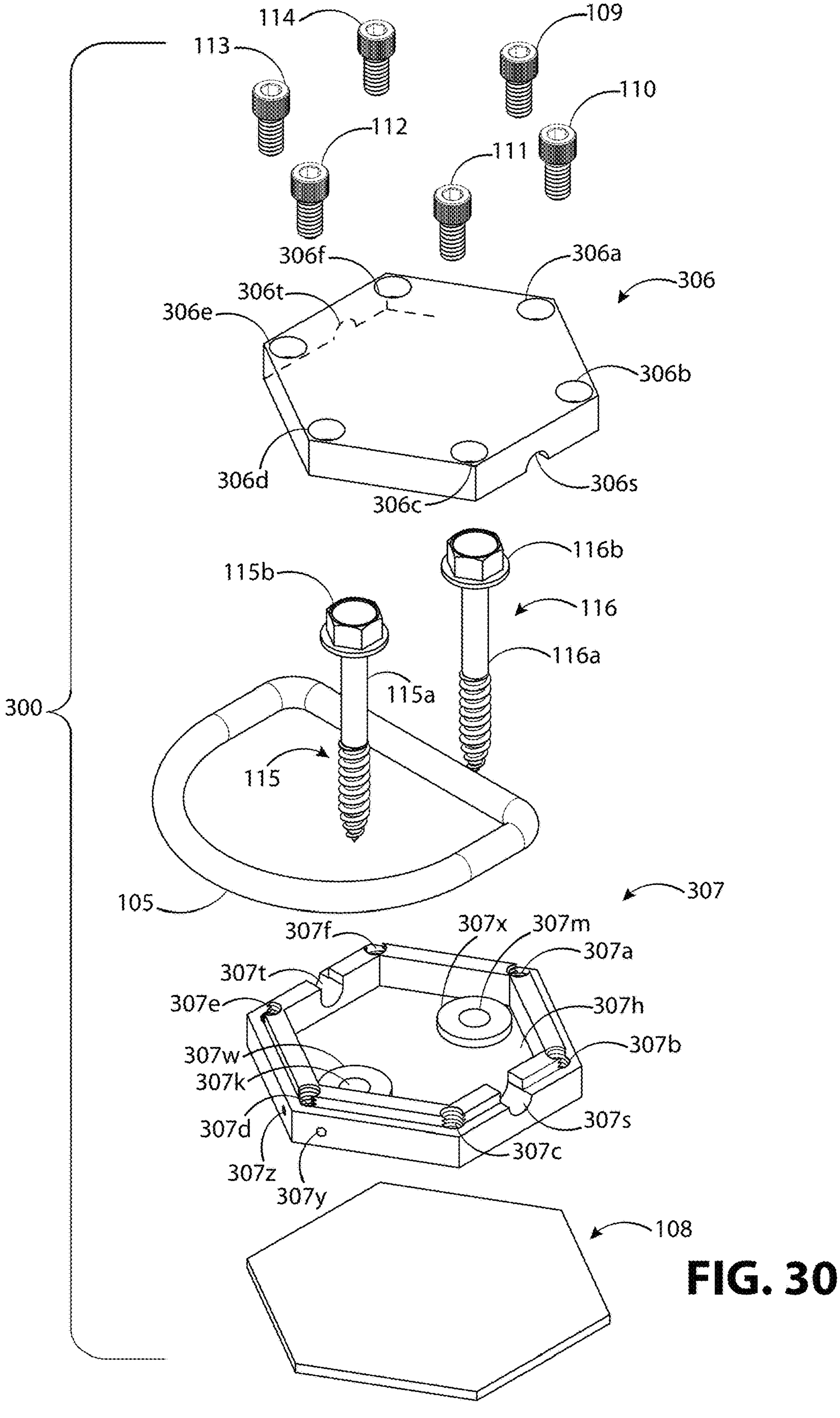
FIG. 30 illustrates an exploded view of the roof safety anchor of FIG. 28.

The remaining figures illustrate two additional examples that embody many of the principles discussed. FIGS. 22-27 illustrate a roof safety anchor 200 that embodies many of the structural features described for roof safety anchor 100 of FIG. 1. Roof safety anchor 200 may support a greater load before pulling out of the roof than the roof safety anchor 100. The inventor envisions that this roof safety anchor 200 may have enough strength to support two persons. FIGS. 28-30 illustrate a simplified example of a roof safety anchor 300, to further demonstrate some of the described principles.

Figure 22:
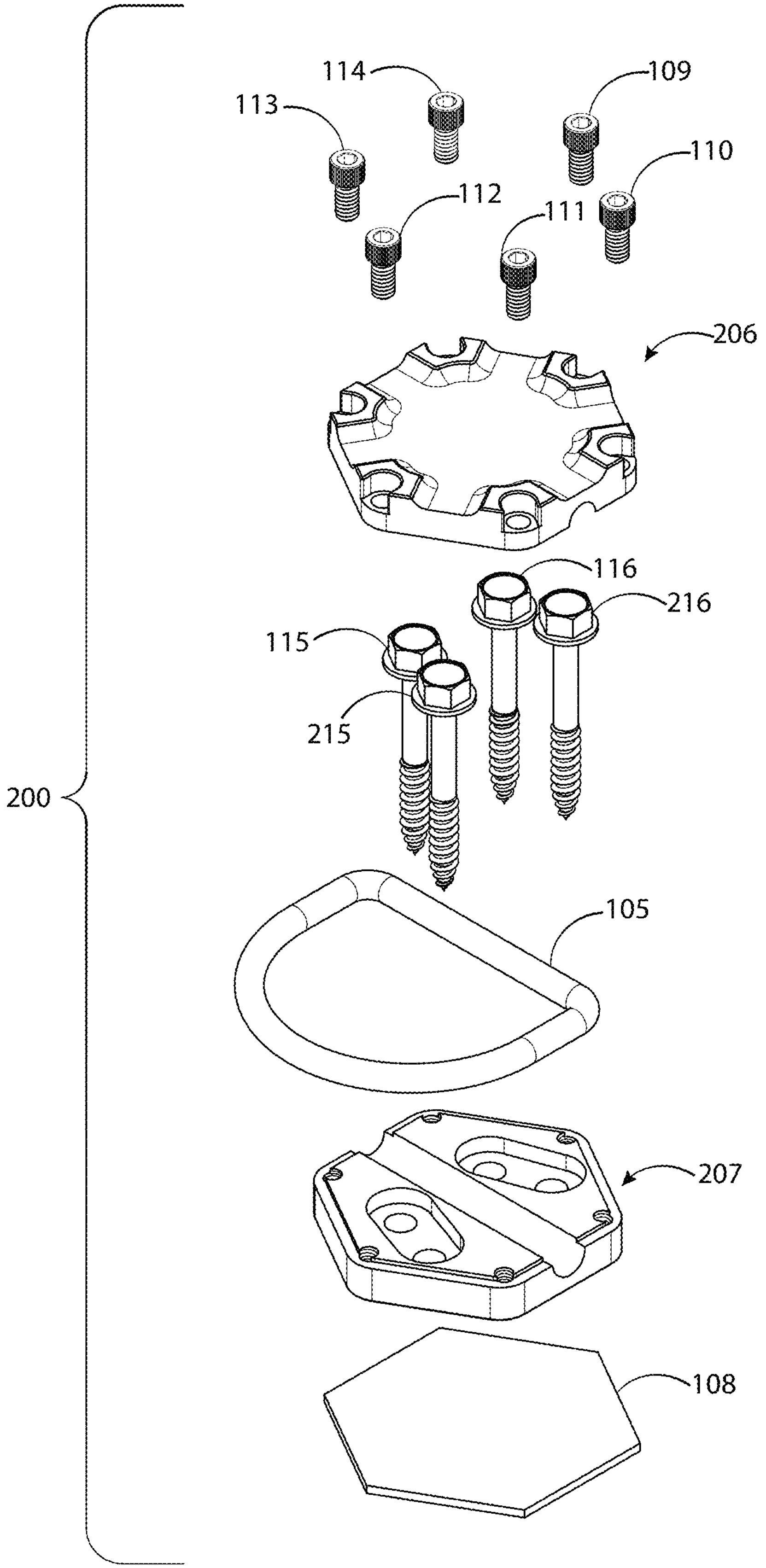
FIG. 22 illustrates an exploded view of a second example of a roof safety anchor of the present disclosure.
Figure 23:
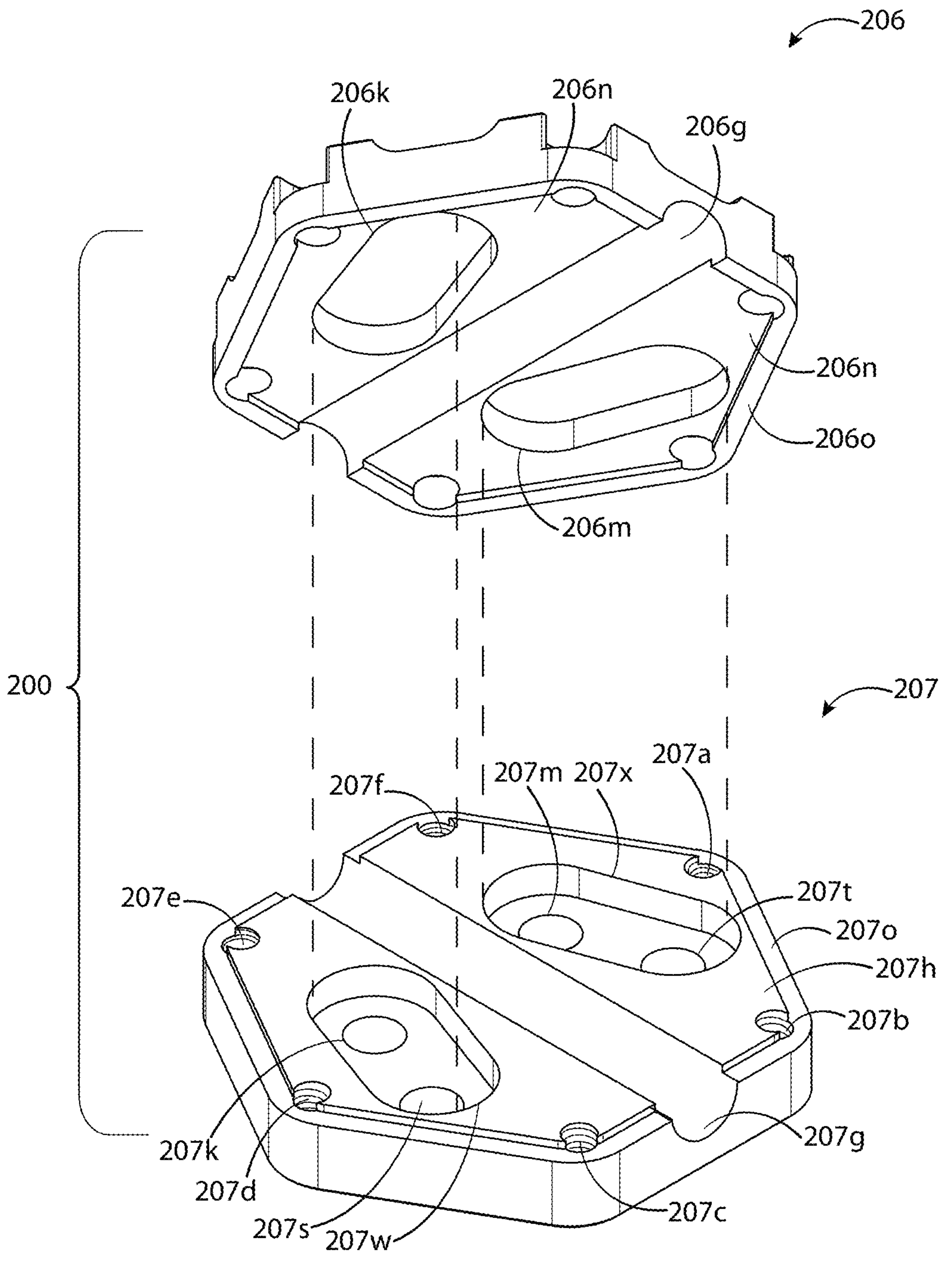
FIG. 23 illustrates, an exploded view of the roof safety anchor of FIG. 22 with the lid in top isometric view, the base in bottom isometric view and with components other than the lid and base removed for clarity.

Referring to FIG. 22, the roof safety anchor 200 includes a lid 206, base 207, threaded fasteners 109, 110, 111, 112, 113, 114, D-ring 105, gasket 108, threaded roof fasteners 115, 116, 215, 216. Referring to FIG. 23, the groove 207*g*, flanged lip 2070, threaded apertures 207*a*, 207*b*, 207*c*, 207*d*, 207*e*, 207*f* of base 207 can be the same as their counterparts in base 107 described in FIGS. 5 and 6. Threaded apertures 207*a*, 207*b*, 207*c*, 207*d*, 207*e*, 207*f* are optionally threaded blind apertures to help control water infiltration into the roof. Similarly, the lid rim 2060 extending from the lid bottom surface 206*n* can be structurally the same as its counterpart, lid rim 106*o* in FIG. 6. The groove 206*g* can be the same as its counterpart, groove 106*g* in FIGS. 6 and 7. Referring FIG. 24, the water-shedding portions 206*s*, 206*t*, 206*u*, 206*v*, 206*w*, 206*x*, lid top surface 206*h*, and apertures 206*a*, 206*b*, 206*c*, 206*d*, 206*e*, 206*f* can be the same as their counterparts in FIG. 15. Therefore, the description of the counterpart structures and their interactions as described in FIGS. 1, 2A-2E, and 3-19 and the assembly method of FIG. 20 and FIGS. 21A-G also applies to the above-named structures for the roof safety anchor 200.

Figure 24:
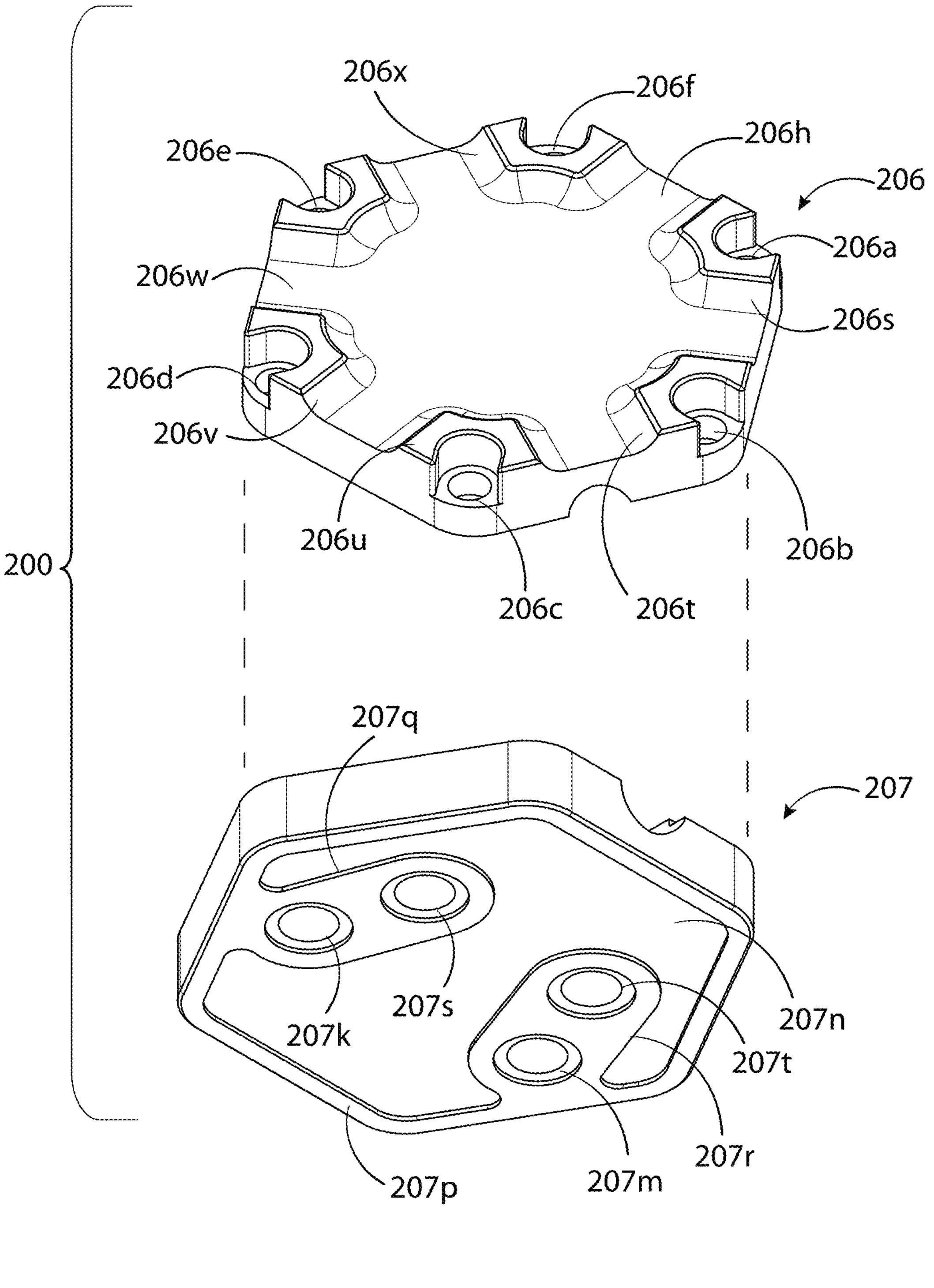
FIG. 24 illustrates, an exploded view of the roof safety anchor of FIG. 22 with the lid in bottom isometric view, the base in top isometric view and with components other than the lid and base removed for clarity.
Figure 25:
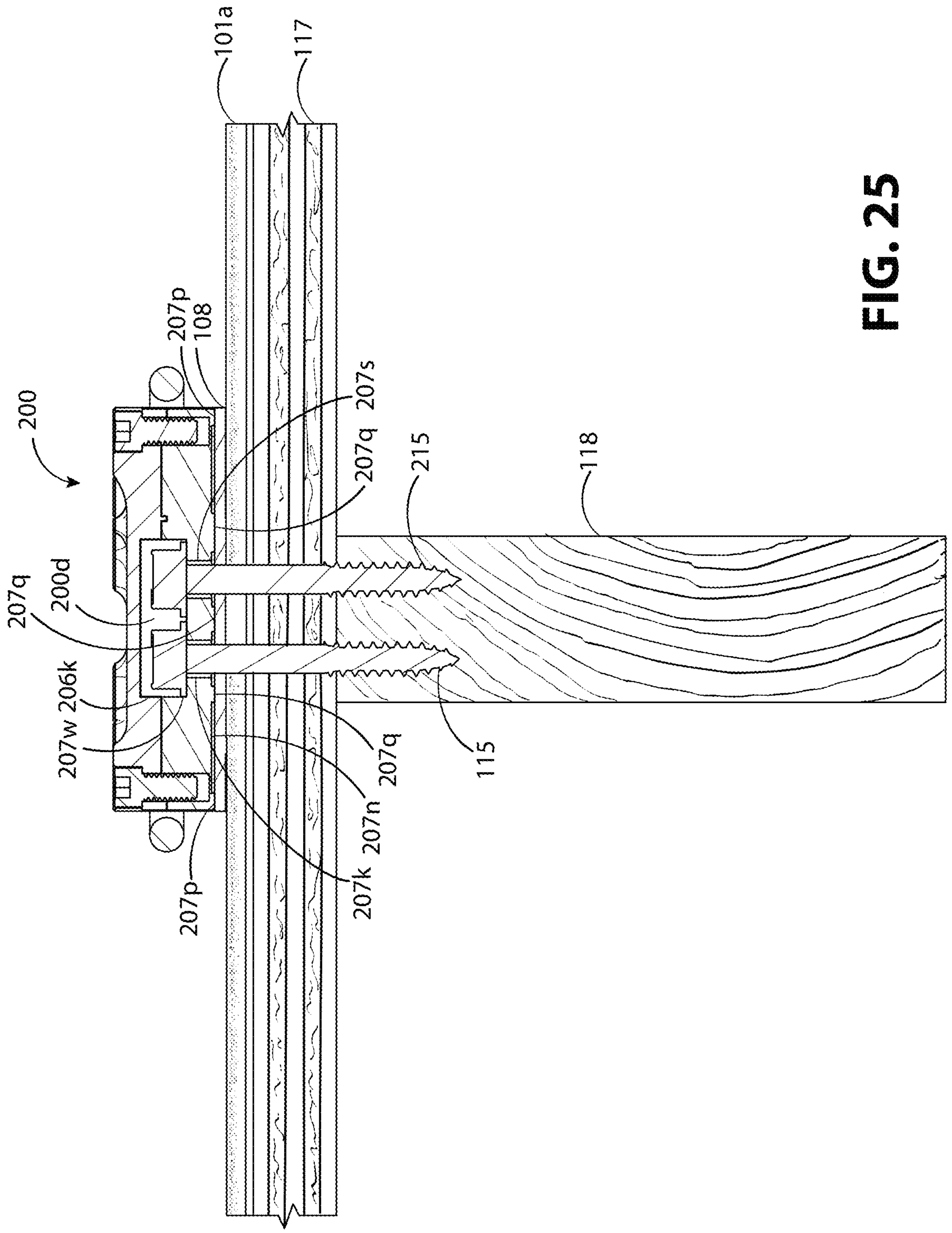
FIG. 25 illustrates a section view of the second example of the roof safety anchor and roof taken along section lines 25-25 in FIG. 27.

The difference between the roof safety anchor 100 of FIG. 5 and roof safety anchor 200 of FIGS. 22-27 has to do with the threaded roof fasteners 115, 116, 215, 216 (FIG. 22) and the structure that surrounds them. Referring to FIGS. 23, the base 207 includes apertures 207*k*, 207*s* surrounded by an upper surround 207*w* extending downward into the base top surface 207*h* and apertures 207*m*, 207*t* surrounded by an upper surround 207*x* extending downward into the base top surface 207*h*. FIG. 23 illustrates the upper surrounds 207*w*, 207*x* as recessed in the base top surface 207*h*. Alternatively, they may extend upward from the base top surface 207*h* to further shed water. The lid 206 includes recess 206*k* and recess 206*m* extending upward into the lid bottom surface 206*n* sized and shaped the same as upper surround 207*w* and upper surround 207*x*, respectively. Recess 206*k* and recess 206*m* align over the upper surround 207*w* and upper surround 207*x*, respectively and form enclosed cavities. FIG. 25 shows how the recess 206*k* and upper surround 207*w* form an enclosed cavity 200*d* around threaded roof fasteners 115, 215. FIG. 25 is a section view of FIG. 27 taken along section lines 25-25.

Figure 26:
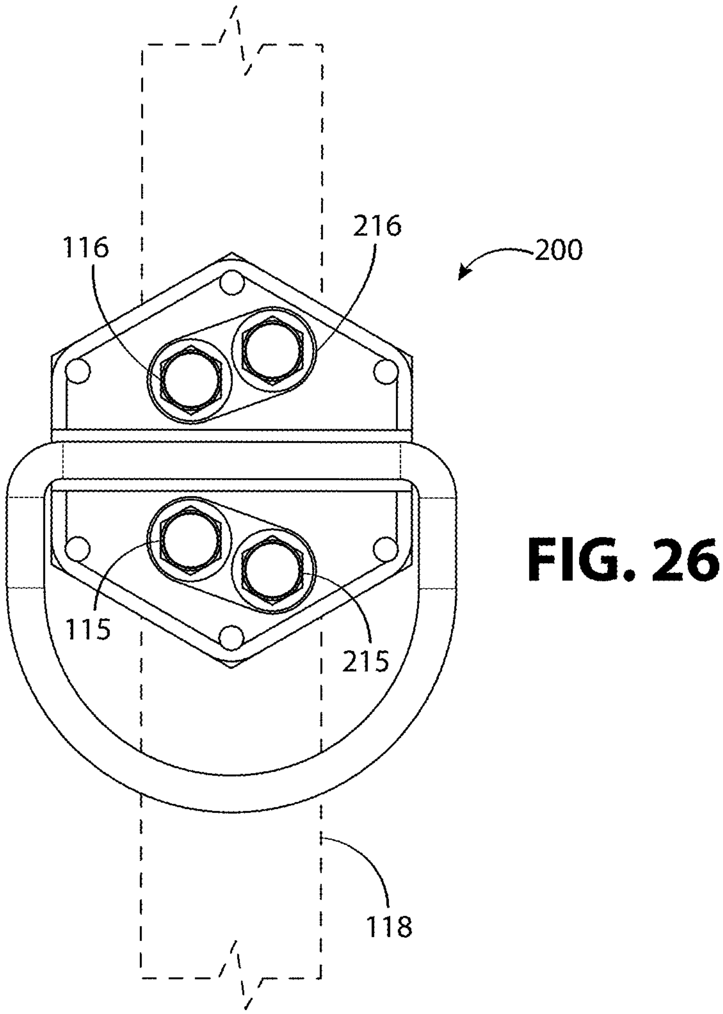
FIG. 26 illustrates a top plan view of the roof safety anchor of FIG. 22 in relation to a roof structural member and with the roof structural member shown in dashed lines to illustrate that it is hidden from view.
Figure 27:
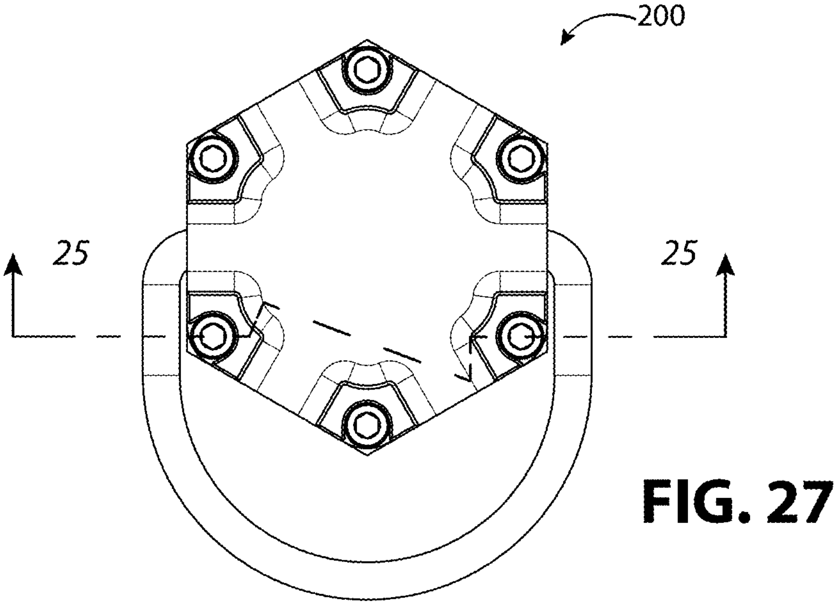
FIG. 27 illustrates a top plan view of the roof safety anchor of FIG. 22 attached to a roof.

Referring to FIGS. 22 and 23, the arrangement of apertures 207*k*, 207*m*, 207*s*, 207*t* (FIG. 23) allows the threaded roof fasteners 115, 116, 215, 216 (FIG. 22) to secure to a roof structural member typically cut from dimensional lumber such as "2×4" or "2×6." A 2×4 is nominally 1.5 inches×3.5 inches (0.0381 meters×0.0762 meters). A 2×6 is nominally 1.5 inches×5.5 inches (0.0381 meters×0.1397 meters). FIG. 26 illustrates the roof safety anchor 200 with the lid removed to show the relationship between the threaded roof fasteners 115, 116, 215, 216 and the roof structural member 118. Threaded roof fasteners 115, 215 and threaded roof fasteners 116, 216 align along axes oblique to the length of the roof structural member 118. Roof threaded fasteners 115, 215 align along an axis oblique to the axis of threaded roof fasteners 116, 216. This increases load capacity over roof safety anchor 100 of FIG. 1 while maintaining the roof safety anchor 200 in the same form factor as roof safety anchor 100. FIG. 25 illustrates threaded roof fasteners 115, 215 extending from the roof safety anchor 200, through the roof shingle 101*a*, the roof decking 117, and into roof structural member 118.

Referring to FIG. 24, the lower surrounds 207*q*, 207*r* extend downward away from the base bottom surface 207*n*. Apertures 207*k*, 207*s* and apertures 207*m*, 207*t* may be counterbored in the lower surrounds 207*q*, 207*r*, respectively. The base rim 207*p* extends downward away from the base bottom surface 207*n* and may lie in the same plane as the lower surrounds 207*q*, 207*r* as illustrated in FIG. 24. Referring to FIG. 25, the base bottom surface 207*n*, lower surround 207*q*, base rim 207*p*, and gasket 108, are structured to use the same water-abatement strategy as discussed for FIGS. 13 and 14.

Referring to FIG. 25, the gasket 108 seats against the roof 101, around the base rim 207*p*, into the recess within the base bottom surface 207*n*, and seats in the recess between the apertures 207*k*, 207*s* and the lower surround 207*q*. With the threaded roof fasteners 115, 215 engaging the roof decking 117 and roof structural member 118, additional material within the gasket 108 may be pushed up into the space between the apertures 207*k*, 207*s* and the lower surround 207*q* as well as the space between the apertures 207*k*, 207*s* and threaded roof fasteners 115, 215. While, not illustrated in FIG. 25, the same description applies to the interaction between the roof, gasket, in combination with apertures 207*m*, 207*t*, surround 207*r* of FIG. 24, and threaded roof fasteners 116, 216 of FIG. 22.

FIGS. 28-30 illustrate a roof safety anchor 300 that embodies many of the principles discussed in this disclosure. Referring to FIGS. 28-30, the roof safety anchor 300 includes a D-ring 105 (FIGS. 29 and 30) and threaded roof fasteners 115, 116 (FIG. 30) enclosed by a lid 306 and a base 307. Referring to FIGS. 29 and 30, threaded fasteners 109, 110, 111, 112, 113, 114 secure the lid 306 to the base 307. Referring to FIG. 30, portions of the threaded fasteners 109, 110, 111, 112, 113, 114 extend through apertures 306*a*, 306*b*, 306*c*, 306*d*, 306*e*, 306*f*, in the lid 306 and are received by and are threadedly secured to threaded apertures 307*a*, 307*b*, 307*c*, 307*d*, 307*e*, 307*f* in the base 307, respectively. Referring to FIG. 29, the threaded fasteners may be positioned, as illustrated, at the vertex edges of the roof safety anchor 300.

Referring to FIG. 30, the D-ring 105 seats in grooves 306*s*, 306*t* in the lid 306 and grooves 307*s*, 307*t* in the base 307. Referring to FIG. 30, the grooves 306*s*, 306*t*, 307*s*, 307*t* may be semi-circular shaped to fit tightly around the D-ring 105. This reduces water leakage. FIG. 28 also illustrates grooves 306*s*, 306*t*.

In the event of water leakage, the apertures 307*k*, 307*m* may be seated through upper surrounds 307*w*, 307*x*, respectively, that extend upward from the base top surface 307*h*. The upper surrounds 307*w*, 307*x*, have sufficient height, to prevent water from penetrating the junction between the roof fastener heads 115*b*, 116*b* and the upper surrounds 307*w*, 307*x*, respectively. Referring to FIGS. 28-30, weep holes 307*y*, 307*z* drain any accumulated water and provide pressure equalization with the outside environment. The pressure equalization helps prevent water infiltration.

Referring to FIGS. 29 and 30, a gasket 108 is secured to the base 307. Referring to FIG. 28, the gasket 108 of FIGS. 29 and 30 secure to the bottom surface 307*n* of base 307 over the apertures 307*k*, 307*m*. The gasket may be an elastomeric material, such as an elastomeric pad, with both waterproof and adhesive properties, such as butyl rubber. Referring to FIG. 30, the gasket will fill the void between the apertures 307*k*, 307*m* and the roof fastener bodies 115*a*, 116*a*, respectively.

Conclusion and Variations

The Summary, Detailed Description, and figures describe a roof safety anchor. This disclosure provides examples of devices, components, and configurations to help the reader understand general principles of the roof safety anchor. The following are examples of variations and combinations of different components, structures, and features that adhere to the general principles.

This disclosure illustrates three examples of roof safety anchors, roof safety anchor 100 of FIG. 5, roof safety anchor 200 of FIG. 22, and roof safety anchor 300 of FIG. 30. This disclosure also discusses a method for securing the roof safety anchor to a roof in FIGS. 20 and FIGS. 21A-21G. Roof safety anchors 100, 200, 300 are not mutually exclusive. One or more of these roof safety anchors may incorporate features from the others. For example, instead of the upper surrounds 107*w*, 107*x* of FIG. 5 being recessed, they could instead extend upward from the base top surface 107*h* like the upper surrounds 307*w*, 307*x* of FIG. 30. Similarly, the upper surrounds 207*w*, 207*x* of FIG. 23 could project upward from the base top surface 207*h* like the upper surrounds 307*w*, 307*x* of FIG. 30.

Referring to FIG. 28, the roof safety anchor 300 could incorporate the lower surrounds 207*q*, 207*r* and the base rim 207*p* of FIG. 24. The roof safety anchor 300 may incorporate the lower surrounds 107*q*, 107*r* of FIG. 15. Referring to FIG. 24, roof safety anchor 200, could replace the lower surrounds 207*q*, 207*r*, with separate surrounds around the apertures 207*k*, 207*m*, 207*s*, 207*t* like the lower surrounds 107*q*, 107*r* of FIG. 15. Referring to FIG. 15, the roof safety anchor 100 could incorporate a single surround around the apertures 107*k*, 107*m* instead of individual surrounds.

Referring to FIG. 29, the roof safety anchor 300 could incorporate the water-shedding portions 106*s*, 106*t*, 106*u*, 106*v*, 106*w*, 106*x* of FIG. 15. Likewise, the roof safety anchor of FIG. 15 and FIG. 22 could be without these water-shedding portions. The shape of the water-shedding portions may be different than illustrated. For example, the water-shedding feature may have a peaked or curved shape, or could have more than three sides.

The apertures in lid 106 of FIG. 5, lid 206 of FIG. 22, and lid 306 of FIG. 30 are not threaded but may optionally be threaded. The threaded fasteners 109, 110, 111, 112, 113, 114 in FIGS. 5, 22, and 30 can be any threaded fastener, that together can provide sufficient fastening force to prevent the cover from pulling out from the base in accordance with regulatory requirements and safety standards for roof safety anchors in the installer's region. The figures illustrate threaded fasteners 109, 110, 111, 112, 113, 114 as a socket head cap screw with a hexagonal socket. The threaded fasteners could use any socket type appropriate for the installation, for example, Torx, Robertson, Philips, or a security socket. A socket head cap screw allows the head of the fastener to sit relatively flush in the aperture (for example in FIG. 29) or flush with surrounding structures (for example, in FIG. 19). While this has benefit, the roof safety anchor may be modified to accept other fastener heads such as hex head or square head by providing more clearance around the fastener head. In addition, an installer could use a button head or low head cap screw without modification to the design.

The threaded roof fasteners 115, 116 of FIGS. 5, 22, and 30, and threaded roof fasteners 215, 216 of FIGS. 22, 25, and 26 are illustrated as flanged hex head screws with threading for wood. These threaded roof fasteners can be any threaded roof fastener sized appropriately to anchor to a roof structural member such as a joist, beam, purlin, or top chord of a truss and provide enough resistance to prevent pulling out during a fall according to local, regional, or national regulatory requirements.

The D-ring 105 shown throughout this disclosure can be made of any material that can withstand breakage during accidents, withstand degradation from the elements, and meet any local, regional, or national regulatory and safety standards for a roof safety anchor. For example, the D-ring can be forged, cast, 3D printed, machined, milled, or extruded and machined, from stainless steel or other metals. It can be molded from a plastic with a metal core. The D-ring is not limited to these examples. The D-ring is also not limited to the illustrated shape.

Likewise, the bases and lids can be can be made of any material that can withstand breakage during accidents, withstand degradation from the elements, and meet local, regional, or national safety and regulatory standards for roof safety anchors. For example, they can be forged, cast, 3D printed, and machined. They may also be molded over a metallic core.

The gasket 108 shown throughout this disclosure is typically an elastomeric material, such as an elastomeric pad, with adhesive properties. For example, butyl rubber, or butyl rubber tape, self-adhesive ethylene propylene diene monomer rubber (EDPM), or EDPM tape. The gasket 108 can be any material that provides sufficient waterproofing and has the properties that allow it to interact with the base and threaded fasteners as described.

The groove 106*g* and 107*g* of roof safety anchor 100 of FIG. 5, groove 206*g* and 207*g* of roof safety anchor 200 of FIG. 23, and grooves 306*s*, 306*t*, 307*s*, 307*t*, of roof safety anchor 300 of FIG. 30 are illustrated with a semi-circular cross section to match the cross section of the D-ring. This allows the groove to tightly surround the D-ring and resist water infiltration. The groove can be other shapes, such as square or rectangular.

While, the method of FIGS. 20 and FIGS. 21A-21F was illustrated with roof safety anchor 100, an installer can use the method for roof safety anchor 200 of FIG. 22 or roof safety anchor 300 of FIG. 30.

Roof 101 discussed throughout this disclosure is illustrated as a shingle roof and the roof safety anchor is shown secured to roof shingles. While the roof safety anchor can be used on various types of shingled roofs, it can be used on other types of roofs, such as flat metal roofs.

The variations described, the general principles taught, and undescribed variations, devices, and systems that encompass the general principles described in this disclosure, are within the claim's scope.

The invention claimed is:

1. A roof safety anchor comprising:

a base including a base bottom surface, a first side, and a second side that is opposite the first side;

a lid secured to the base, the lid includes a third side, and a fourth side that is opposite to the third side;

the third side of the lid is seated over the first side of the base, and the fourth side of the lid is seated over the second side of the base;

a gasket secured to the base bottom surface;

a D-ring pivotally captured between and including a first portion extending through, the first side and the second side of the base and the third side and the fourth side of the lid; and a threaded roof fastener, covered by the lid, seated by the base, and a second portion of which extends through the base and the gasket.

2. The roof safety anchor of claim 1, wherein:

a first opening formed in the first side and the third side and a second opening formed between the second side and the fourth side pivotally capture the D-ring between the lid and the base.

3. The roof safety anchor of claim 1, wherein:

the base includes a base top surface, the base top surface includes a groove that extends from the first side to the second side of the base; and the D-ring is seated in the groove.

4. The roof safety anchor of claim 1, wherein:

the lid includes a lid bottom surface, the lid bottom surface includes a groove that extends from the third side to the fourth side of the lid; and the D-ring is seated in the groove.

5. A roof safety anchor comprising:

a base including a base bottom surface;

a lid seated over the base and secured to the base;

a gasket secured to the base bottom surface;

a D-ring pivotally captured between opposite sides of the lid and corresponding opposite sides of the base;

a threaded roof fastener, covered by the lid, seated by the base, and a portion of which extends through the base and the gasket;

the base includes a groove in a base top surface and extending between the opposite sides of the base; and the groove is structured to seat the D-ring between the lid and the base.

6. The roof safety anchor of claim 5, wherein:

the threaded roof fastener is a first threaded roof fastener and a second threaded roof fastener that are positioned in the base top surface on opposite sides of the groove.

7. A roof safety anchor, of claim 5, wherein:

the base bottom surface includes an aperture that receives the threaded roof fastener and a lower surround that extends downward from the base bottom surface and forms a closed perimeter around the aperture.

8. A roof safety anchor comprising:

a base, the base includes a base bottom surface, a first side, and a second side that is opposite the second side;

a lid secured to the base, the lid includes a lid rim extending downward from a perimeter surrounding the lid, the lid rim includes a third side, and a fourth side that is opposite of the third side, the third side of the lid rim seats against the first side of the base and the fourth side of the lid rim seats against the second side of the base;

a D-ring extending through the third side and the fourth side of the lid rim;

a gasket secured to the base bottom surface; and a threaded roof fastener, covered by the lid, seated by the base, and a portion of which extends through the base and the gasket.

9. The roof safety anchor of claim 8, comprising:

the D-ring pivotally captured between the lid and the base.

10. The roof safety anchor of claim 7, wherein:

the base includes a base top surface and a groove in the base top surface, the groove extending between opposite sides of the base; and the groove is structured to seat the D-ring between the lid and the base.

11. The roof safety anchor of claim 10, wherein:

the lid includes a lid bottom surface and a second groove in the lid bottom surface, the second groove extends between second opposite sides of the lid; and the groove and the second groove are structured and positioned to pivotally capture the D-ring.

12. A roof safety anchor, comprising:

a base, the base includes a base bottom surface and a base top surface with a flanged lip;

a lid seated over the flanged lip and secured to the base;

a gasket secured to the base bottom surface;

a threaded roof fastener, covered by the lid, seated by the base, and a portion of which extends through the base and the gasket; and the lid includes a lid rim extending downward from a perimeter surrounding the lid, the lid rim seats against the flanged lip.

13. The roof safety anchor of claim 12, further comprising:

a D-ring pivotally captured between the lid and the base.

14. A roof safety anchor, comprising:

a base including a base bottom surface, a first side, and a second side that is opposite the first side;

a gasket secured to the base bottom surface;

a lid secured to the base, the lid includes a third side and a fourth side that is opposite the third side;

the third side of the lid is seated over the first side of the base, and the fourth side of the lid is seated over the second side of the base;

a first opening formed between the first side of the base and the third side of the lid and a second opening formed between the second side of the base and the fourth side of the lid;

a D-ring pivotally captured between the first opening and the second opening;

a first portion of the D-ring extending through the first opening and a second portion of the D-ring extending through the second opening; and a threaded roof fastener, covered by the lid, seated by the base, and a portion of which extends through the base and the gasket.

15. The roof safety anchor of claim 14, wherein:

the first opening is formed by a first groove in the first side of the base and a third groove in the third side of the lid; and the second opening is formed by a second groove in the second side of the base and a fourth groove in the fourth side of the lid.

16. The roof safety anchor of claim 14, wherein:

the base includes a first groove that extends from the first side to the second side;

the lid includes a second groove that extends from the third side to the fourth side; and the first opening and the second opening are formed by the first groove and the second groove.

17. The roof safety anchor of claim 14, wherein:

the base includes a groove that extends from the first side to the second side; and the D-ring is seated in the groove.

18. The roof safety anchor of claim 14, wherein:
the lid includes a groove that extends from the third side to the fourth side; and
the D-ring is seated in the groove.

19. The roof safety anchor of claim 14, wherein:
the D-ring is continuous between the first portion and the second portion.

20. The roof safety anchor of claim 14, wherein:
the D-ring is not continuous between the first portion and the second portion.

* * * * *